United States Patent
Atanassov et al.

(10) Patent No.: US 12,351,767 B2
(45) Date of Patent: Jul. 8, 2025

(54) ROBUST PALLADIUM HYDRIDE CATALYST FOR ELECTROCATALYTIC FORMATE FORMATION WITH HIGH CO TOLERANCE

(71) Applicant: The Regents of the University of California, Oakland, CA (US)

(72) Inventors: Plamen Atanassov, Irvine, CA (US); Shengyuan Guo, Irvine, CA (US); Yuanchao Liu, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 17/957,693

(22) Filed: Sep. 30, 2022

(65) Prior Publication Data
US 2023/0099785 A1    Mar. 30, 2023

Related U.S. Application Data

(60) Provisional application No. 63/250,673, filed on Sep. 30, 2021.

(51) Int. Cl.

| | |
|---|---|
| C10L 1/02 | (2006.01) |
| B01J 31/12 | (2006.01) |
| C25B 3/07 | (2021.01) |
| C25B 3/26 | (2021.01) |
| C25B 9/19 | (2021.01) |
| C25B 9/63 | (2021.01) |
| C25B 11/037 | (2021.01) |
| C25B 11/065 | (2021.01) |
| C25B 11/081 | (2021.01) |
| C25B 13/04 | (2021.01) |
| C25B 15/08 | (2006.01) |

(52) U.S. Cl.
CPC ............... *C10L 1/02* (2013.01); *B01J 31/121* (2013.01); *C25B 3/07* (2021.01); *C25B 3/26* (2021.01); *C25B 9/19* (2021.01); *C25B 9/63* (2021.01); *C25B 11/037* (2021.01); *C25B 11/065* (2021.01); *C25B 11/081* (2021.01); *C25B 13/04* (2013.01); *C25B 15/08* (2013.01); *C10L 2200/0254* (2013.01)

(58) Field of Classification Search
None
See application file for complete search history.

(56) References Cited

FOREIGN PATENT DOCUMENTS

JP     2008210572    *  9/2008

OTHER PUBLICATIONS

Bugaev et al. Faraday Discussions, 208, 187 (Year: 2018).*
Norskov et al. Topics in Catalysis, 2006, 40(1-4), 45-48). (Year: 2006).*

* cited by examiner

*Primary Examiner* — Yun Qian
(74) *Attorney, Agent, or Firm* — NGUYEN TARBET IP LAW

(57) ABSTRACT

A supported catalyst for reducing $CO_2$ is provided. The supported catalyst includes a plurality of support particles; and a plurality of catalyst particles disposed over each support particle. Characteristically, the catalyst particles has formula $PdH_x/C$ wherein x is 0.3 to 0.7. Methods for making the support particles and using the support particles to reduce carbon dioxide are also provided.

7 Claims, 21 Drawing Sheets
(2 of 21 Drawing Sheet(s) Filed in Color)

ROBUST PALLADIUM HYDRIDE CATALYST FOR ELECTROCATALYTIC FORMATE FORMATION WITH HIGH CO TOLERANCE

This application claims the benefit of U.S. provisional application Ser. No. 63/250,673 filed Sep. 30, 2021, the disclosure of which is hereby incorporated in its entirety by reference herein.

STATEMENT REGARDING FEDERALLY SPONSORED RESEARCH OR DEVELOPMENT

The invention was made with Government support DOE-EERE-BETO to Colorado State University under Contract No. EE0008923 awarded by the Department of Energy (DOE). The Government has certain rights to the invention.

TECHNICAL FIELD

In at least one aspect, palladium hydride catalysts for electrocatalytic formate formation is provided.

BACKGROUND

Electrochemical carbon dioxide reduction reactions ($CO_2RR$), are a promising method to effectively convert carbon dioxide into value-added fuel using renewable electrical energy, cannot only reduce the industrial carbon footprint, alleviating global greenhouse emissions but also utilize renewable and clean energy, reducing the demand for fossil fuels.[1-5] However, traditional electrochemical $CO_2RR$ still faces many challenges, such as high overpotential[6-10], low selectivity of products[7-15], and competition from the hydrogen evolution reaction[16]. The general optimization in current field includes the utilization of gas diffusion electrode-based electrolyzer[17], advanced electrocatalysts[18], and the integration of electrocatalytic and biocatalytic cascade systems[19]. But the development of an efficient electrocatalyst is always the key point to the approach of $CO_2$ electroreduction technology. The $CO_2RR$ products depend on the binding energy of intermediates (i.e., *COOH, *OCHO, and *H) to different catalyst surfaces[20], which can be divided into four categories: (1) hydrogen ($H_2$) producing catalysts including Pt, Ni, Fe, etc.;[21,22] (2) carbon monoxide (CO) producing catalysts including Au, Ag, Zn, as well as atomically dispersed metal on nitrogen-doped carboneous material (M—N—C), etc.[18,23-30] (3) hydrocarbon (e.g., methane, methanol, ethanol, etc.) producing catalysts, in which Cu is the only functioning and most widely studied metal due to its near-ideal binding strength;[31-39] (4) formate or formic acid (HCOO— or HCOOH) producing catalysts including Sn, In, Pb, Pd, etc.[40-45] Among all the products from $CO_2RR$, formic acid possesses the highest normalized price per electron (16.1 \$/e-)[46], indicating its high practical value.[47-52] So far, three reaction pathways for HCOOH formation have been proposed, which proceed via *OCHO, *COOH, and *H intermediates.[53-58]

OCHO Pathway:

$$CO\_2+[e^-+H^+(aq)]+* \rightarrow *OCHO \quad (1)$$

$$*OCHO+[e^-+H^+(aq)] \rightarrow +HCOOH \quad (2)$$

*COOH Pathway:

$$CO\_2+[e^-+H^+(aq)]+* \rightarrow *COOH \quad (3)$$

$$*COOH+[e^-+H^+(aq)] \rightarrow *+HCOOH \quad (4)$$

*H Pathway:

$$*+[e^-+H^+(aq)] \rightarrow *H \quad (5)$$

$$*H+CO\_2 \rightarrow *HCOO \quad (6)$$

$$*HCOO+[e^-+H^+(aq)] \rightarrow *+HCOOH \quad (7)$$

where * indicates the vacant site on the catalysts surface or the adsorbed intermediates. For example, Koh et al. showed by theoretical calculations that the *OCHO pathway was more energetically favorable on bismuth surfaces.[53] The whole process consists of two-electron and two-proton transfers, in which the first proton/electron transfer is usually regarded as the rate-determining step (RDS).

Tin (Sn) has been widely investigated since it is located near the top of the volcano plot using *OCHO binding energy as the descriptor for formate[57], suggesting its near-optimal binding energy towards the formate production via the *OCHO pathway. A mesoporous $SnO_2$ nanosheet catalyst has been reported to produce formate with a faradaic efficiency of 83% at −0.9 V (vs. RHE).[59] SnO2 porous nanowires (Sn-pNWs) also show a faradaic efficiency of 80% at −0.8 V (vs. RHE).[60] Similarly, bismuth (Bi) also favors the *OCHO pathway over the *COOH and *H pathways.[61,62] Faradaic efficiency above 90% for formate has been reached using bismuth-based catalysts.63-66 Additionally, other metal-based catalysts have been reported in the literature for formate production from $CO_2$, such as Indium (In)[67], Cobalt (Co)[68], Antimony (Sb)[69], etc. However, a key drawback of these catalysts is the high overpotential required and thus low cathodic energy efficiency, rendering superfluous energy loss.[21,70-72]

In recent years, Pd-based materials have shown unique catalytic advantages in $CO_2RR$: Pd can selectively reduce $CO_2$ to formic acid at near-equilibrium potential.[55,73,74] Several works have shown that metallic Pd was capable of exclusively reducing $CO_2$ into HCOO— with high faradaic efficiency (≥95%) in the low-overpotential range (≤−200 mV vs. RHE), whereas a more negative potential (≤−500 mV) promoted the formation of unwanted CO and $H_2$ by-products.[55,75-77] A critical limitation, however, is the poor stability of Pd catalysts in $CO_2$ reduction due to poisoning and deactivation of active sites from minor produced CO. Since the CO molecule has very strong adsorption energy on Pd surfaces (−1.36 eV on hollow fcc surface) [78], once CO is produced or adsorbed, it cannot spontaneously desorb at cathodic conditions and thus deactivates the Pd surface. This fundamentally restricts Pd catalysts' further application. In 2015, Kanan and co-workers pointed out that even the formation of CO remained negligible at low overpotentials, the Pd surface was still poisoned and deactivated by CO accumulation over time, resulting in a rapid decrease of current and faradaic efficiency after the first few minutes or tens of minutes.[55] A Similar trend was also observed in the study of Bao et al. in 2017 and Snyder et al. in 2019, which showed a complete deactivation in 10 min and 4 min, respectively.[75,79] Although a brief exposure to air was able to remove surface-bound CO and partially restore the catalyst activity,[55,80] this operation is not practical in industrial applications. So far, catalyst optimization is still the focus of the current field. Specifically, Sargent and co-workers reported that on high index Pd facets the $CO_2RR$ activity (~18 mA cm$^{-2}$) was increased 3-fold as compared to lower index facets (~6 mA cm$^{-2}$).[80] With an excess Pd loading on the working electrode (~83 mgPd/cm$^2$), the reductive current density (22 mA cm$^{-2}$) and faradic efficiency (~97%) at −0.2 V vs RHE were maintained for up to 1 hour under a strong diffusion-limited condition. Similar activity improvement by high index facets was also observed on electrodeposited porous Pd.[81] CO suppression at non-diffusion limited conditions was attempted by doping or alloying Palladium with other elements to downshift the d-band center of surface Pd atoms, which weakened the CO adsorption free energy. In 2018, Cai and co-workers reported a boron-doped Pd catalyst (Pd—B/C) that demonstrated improved HCOOH formation from $CO_2$ as opposed to the undoped Pd catalyst. An enhanced CO tolerance was achieved with an 80% FE over 30 min and 55% FE over 3 hours.[77,82] In addition to this, other literature showed that alloyed PdCu, PdNi, and PdCo displayed varying degrees of improved resistance to CO poisoning.[79,83,84] Collectively, there is no Pd catalyst can well-balance the FE and stability—either high FE (95%) with low stability (10 min) or low FE (55%) with high stability (300 min). Therefore, a Pd-based catalyst with both faradaic efficiency, stability, as well as activity taken into account is needed for $CO_2RR$.

Since Pd is capable of absorbing over 900 times its own volume of hydrogen at room temperature and atmospheric pressure,[85,86] palladium hydride ($PdH_x$) can be easily formed in $\alpha$-phase (x<0.017) or $\beta$-phase (x>0.58), where x indicates the ratio of absorbed metallic H and Pd.[87] In electrocatalysis, $PdH_x$ can be formed on the surface or subsurface of Pd at cathodic conditions[88], promoting the electrochemical reduction process. For example, a permanent Pd hydride catalyst has shown potential for the electrochemical nitrogen reduction reaction.[89] The engagement of PdHx facilitates the electrohydrogenation of $CO_2$[55], and the formation of the *OCHO intermediate instead of *COOH as suggested by density functional theory (DFT) calculation.[75] The selectivity towards formate for catalysts with varying morphology is determined by the formation and participation rate of the PdHx active phase, which the nanostructured surfaces with higher defect density can achieve more readily.[76,81,90]

Accordingly, there is a need for improved catalysts for reducing $CO_2$ to formate.

SUMMARY

In at least one aspect, a hydrogen-rich palladium hydride catalyst ($PdH_{0.5}$/C) for HCOOH production via $CO_2RR$ with high faradaic efficiency at low overpotentials and high tolerance to CO poisoning is provided. The FE for formate on the $PdH_{0.5}$/C catalyst was maintained above 90% over a 4-hour electrolysis at −0.4V in $CO_2$-saturated 0.1 M $KHCO_3$ electrolyte, which is about 15 times higher than that of a commercial Pd/C catalyst as a control. Meanwhile, the particle size and lattice hydrogen content of $PdH_{0.5}$ was maintained throughout the electrolysis. Isotopic analysis demonstrated a direct participation of the lattice hydrogen in $HCOO^-$ formation and also supported a *H pathway as show in equation 5-7.[53-55]

In another aspect, a supported catalyst for reducing $CO_2$ is provided. The supported catalyst includes a plurality of support particles; and a plurality of catalyst particles disposed over each support particle. Characteristically, the catalyst particles has formula $PdH_x$/C wherein x is 0.3 to 0.7.

In another aspect, a method for forming catalysts for reducing $CO_2$ supported on a substrate particle is provided. The method includes steps of dispersing support particles into an organic solvent and dissolving a palladium-containing compound into the organic solvent to form a first reaction mixture at a first temperature. One or more surfactants are added to the first reaction mixture to form a second reaction mixture at a second temperature. The second reaction mixture is heated to a third temperature. A reducing agent is introduced into the second reaction mixture to form a third reaction mixture. The third reaction mixture is heated to a fourth temperature to form a supported catalyst. The supported catalyst includes a plurality of support particles and a plurality of catalyst particles disposed over each support particle. Characteristically, the catalyst particles has formula $PdH_x$/C wherein x is 0.3 to 0.7.

In another aspect, an electrochemical cell for reducing $CO_2$ is provided. The electrochemical cell includes an electrochemical cell chamber partitioned into a working compartment and a counter compartment. An ionomeric membrane separates the working compartment and the counter compartment. An electrolyte is disposed in the working compartment and the counter compartment. A working electrode is positioned in the working compartment. The working electrode includes an electrode support and a supported catalyst dispersed over a surface of the electrode support. The supported catalyst includes a plurality of support particles; and a plurality of catalyst particles disposed over each support particle. Characteristically, the catalyst particles has formula $PdH_x$/C wherein x is 0.3 to 0.7. The electrochemical cell also includes a counter electrode disposed in the counter compartment. The electrochemical cell also includes and a $CO_2$ source that introduces $CO_2$ into the working compartment. A voltage source is configured to negatively bias the working electrode with respect to the counter electrode such that $CO_2$ is reduced to formate.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a further understanding of the nature, objects, and advantages of the present disclosure, reference should be made to the following detailed description, read in conjunction with the following drawings, wherein like reference numerals denote like elements and wherein:

FIG. 3. Determination of hydrogen content in palladium hydride nanoparticles, by quantifying the lattice expansion (TEM) and the Pd(111) peak shift (XRD) in FIG. 2. The lattice constant value and XRD peak position were plotted as a function of H and Pd ratio, according to Bragg's law. Blue and green rectangles show XRD- and TEM-derived lattice hydrogen contents, respectively.

FIGS. 4A-1, 4A-2, 4A-3, 4B, and 4C. Electrochemical performance of $PdH_{0.5}/C$ catalyst for HCOO— production. (A) Cathodic linear sweep voltammetry of carbon support (Vulcan 72R), commercial Pd/C and $PdH_{0.5}/C$. The scans were conducted at a rate of 5 mV/s in Ar-saturated (black) and $CO_2$-saturated (red) 0.1 M $KHCO_3$ electrolyte. (B) Chronoamperometry of $CO_2$ electroreduction of $PdH_{0.5}/C$ in $CO_2$-saturated 0.1 M $KHCO_3$ solution at different potentials vs. RHE. (C) Potential dependent study of faradaic efficiency and Pd-mass normalized production rates of HCOOH for $PdH_{0.5}/C$ catalyst.

FIGS. 6A, 6B-1, 6B-2, and 6C. Proposed reaction mechanism for HCOO— formation on Pd—$H_{0.5/C}$ catalyst. (A). Chemical composition and graphic representation of Palladium hydrides in different phases. (B). Illustration of lattice hydrogen ($H^0$) and surface hydrogen ($H^*$) pathway towards electrocatalytic HCOO— formation on Pd—$H_{0.5}$ and Pd surfaces. (C). Illustration of the lattice hydrogen pathway in a protium-free system composed of $D_2O$ and $K_2CO_3$.

FIGS. 8A, 8B, and 8C. (A, B) HRTEM HAADF/BF image of $PdH_{0.5}/C$ catalyst and (C) representative line intensity profile of lattice plane (111).

FIGS. 15A-1, 15A-2, 15B-1, and 15B-2. (A) $CO_2$ reduction activity recovery with air exposure for $PdH_{0.5}/C$. $CO_2$ reduction at –0.4V (vs RHE) in $CO_2$-saturated 0.1 M $KHCO_3$ with air exposure for 5 mins in between. (B) $CO_2$ reduction activity recovery with positive potential shock for $PdH_{0.5}/C$. $CO_2$ reduction at –0.4V (vs RHE) in $CO_2$-saturated 0.1 M $KHCO_3$ with 1.1V (vs RHE) shock for 5 mins in between. TEM images after each cycling performance test are shown on the right.

DETAILED DESCRIPTION

Figure 1A:
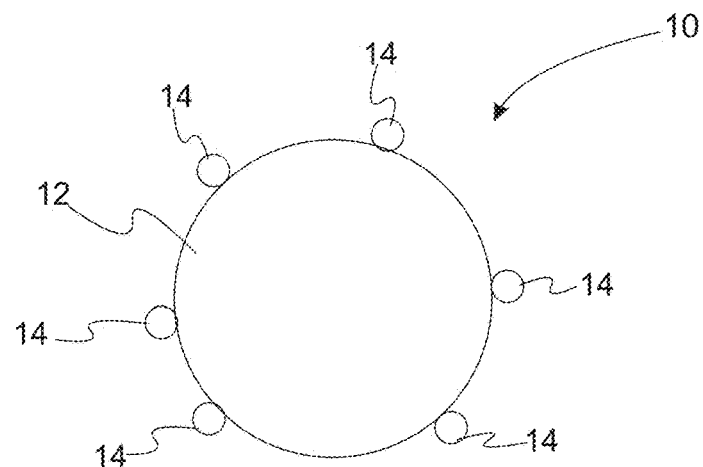
FIG. 1A. Schematic of a supported catalyst.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e., the range from 95 to 105. Generally, when the term "about" is used, it can be expected that similar results or effects according to the invention can be obtained within a range of +/−5% of the indicated value.

As used herein, the term "and/or" means that either all or only one of the elements of said group may be present. For example, "A and/or B" shall mean "only A, or only B, or both A and B." In the case of "only A", the term also covers the possibility that B is absent, i.e., "only A, but not B."

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of" Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" and "multiple" as a subset. In a refinement, "one or more" includes "two or more."

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numeral quantity, in a refinement, the term "less than" includes a lower non-included limit that is 5 percent of the number indicated after "less than." For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, or 1 percent of the number indicated after "less than."

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

Abbreviations

"$CO_2RR$" means carbon dioxide reduction reaction.
"FE" means faradaic efficiency.
"LSV" means linear sweep voltammetry.

In at least one aspect, the present invention is related to the electrochemical reduction of $CO_2$. Electrochemical reduction of $CO_2$ to formic acid is of great significance to renewable chemical synthesis and green energy storage. Palladium stands out from many potential electrocatalysts because of its unique capability of producing formate at low overpotential or even near-equilibrium potential. Inevitably produced CO, however, poisons and deactivates the surface of Pd, resulting in an insufficient operating life-time for conventional and even optimized Pd catalysts. Herein, we present a hydro-gen-rich Palladium Hydride catalyst ($PdH_{0.5}/C$) derived from a one-step solvothermal synthesis. This catalyst showed a 93.1% faradaic efficiency for formate at −0.4 V (vs RHE). The working lifetime reached a record of 4 hours, which was ~15 times longer than a commercial Pd catalyst and outperforming all previously reported Pd-based catalysts in electrosynthesis of formate from $CO_2$. The high CO tolerance was attributed to the high selectivity towards formate with the presence of lattice hydrogen and the relatively weak CO adsorption strength on diverse active sites (i.e. kink, step, and terrace) of our catalyst. Isotopic analysis revealed a direct participation of lattice hydrogen in the protonation of the carbon atoms during formate formation. A detailed mechanism of the hydrogen transformation was proposed for both hydride and pure Pd catalysts.

With reference to FIG. 1A, a schematic of a supported catalyst particle is provided. Supported catalyst particle 10 includes a support particle 12 (e.g., a carbon particle). Catalyst particles 14 are disposed over each support particle 12. Characteristically, catalyst particles 14 are described by formula $PdH_x/C$, wherein x is 0.3 to 0.7. In some refinements, x is at least 0.1, 0.2, 0.3, 0.4, 0.45, or 0.48 and at most least 0.9, 0.8, 0.7, 0.6, 0.55, or 0.52. In a refinement, catalyst particles 14 are described by formula $PdH_{0.5}/C$. Typically, the catalyst particles have an average particle diameter of about 1 to 10 nm. In a refinement, the catalyst particles have an average particle diameter of about 2.5 to 4 nm with an average of about 3.15.

In some variations, the supported catalyst advantageously has a faradaic efficiently greater than 90% for formate at −0.4 V (vs. RHE) after 4 hours of initial operation. In some refinements, the supported catalyst advantageously has a faradaic efficiently greater than 80%, 85%, 90%, or 95% for formate at −0.4 V (vs. RHE) after 4 hours of initial operation In another variation, the supported catalyst has a BET surface area from about 90 $m^2/g$ to 110 $m^2/g$. In some refinements, the supported catalyst has a BET surface area of at least 75 $m^2/g$, 80 $m^2/g$, 85 $m^2/g$, 90 $m^2/g$, 95 $m^2/g$, or 100 $m^2/g$. In further refinements, the supported catalyst has a BET surface area of at least 150 $m^2/g$, 130 $m^2/g$, 125 $m^2/g$, 120 $m^2/g$, 110 $m^2/g$, or 110 $m^2/g$. In a refinement, the supported catalyst has a BET surface area greater than 100 $m^2/g$.

Figure 1B:
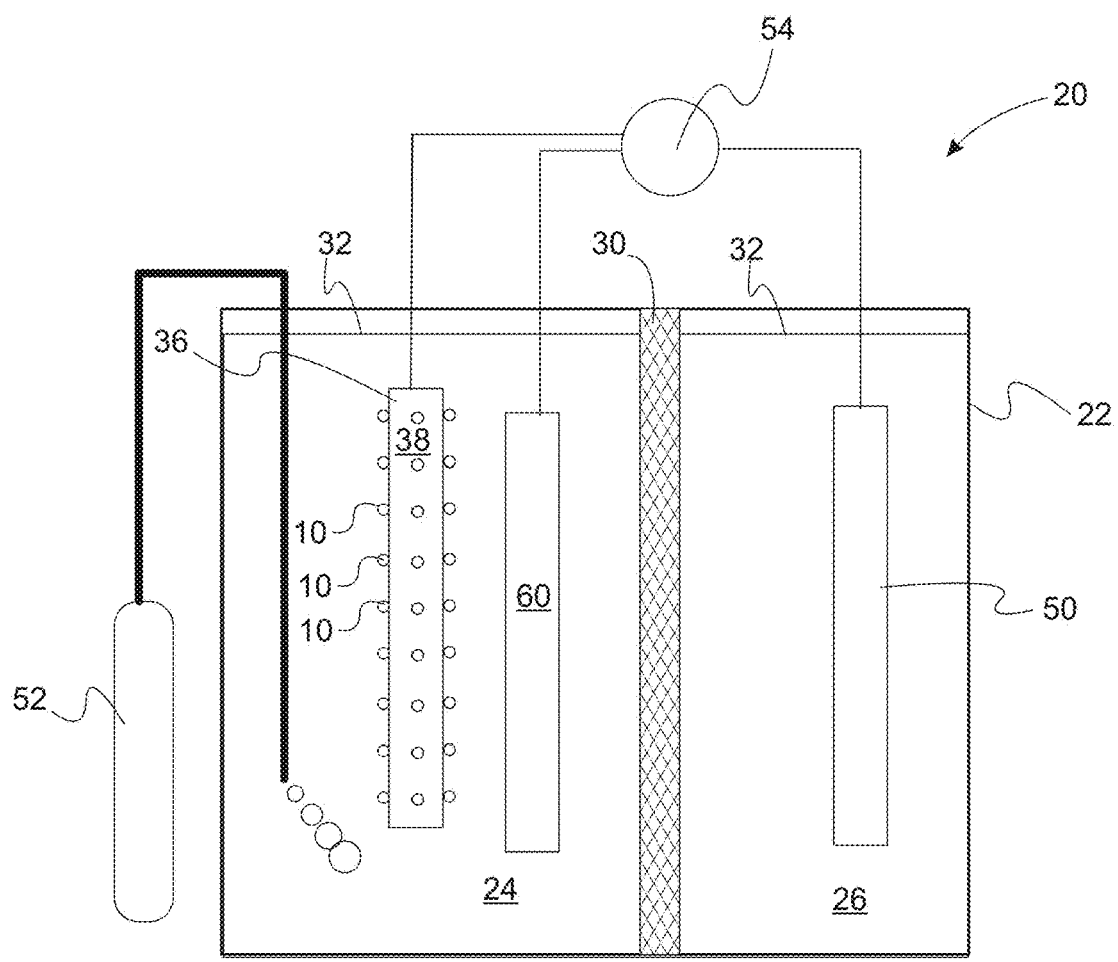
FIG. 1B. Schematic of an electrochemical cells using the supported catalyst of FIG. 1A.

Referring to FIG. 1B, a schematic of an electrochemical cell for reducing $CO_2$ is provided. Electrochemical cell 20 includes an electrochemical cell chamber 22 partitioned into a working compartment 24 and a counter compartment 26. Ionomeric membrane 30 separates the working compartment 24 and the counter compartment 26. An electrolyte 32 is disposed in the working compartment and the counter compartment. Working electrode 36 is positioned in the working compartment 24. Working electrode 36 includes electrode support 38 and supported catalysts 10 dispersed over a surface of the electrode support 38. Each supported catalyst 10 includes a plurality of support particles and a plurality of catalyst particles disposed over each support particle as set forth above in connection to the description of FIG. 1A. The catalyst particles are described by formula $PdH_x/C$, wherein x is 0.3 to 0.7. In a refinement, the catalyst particles are described by formula $PdH_{0.5}/C$. Counter electrode 50 is disposed in the counter compartment 26. Electrochemical cell 20 includes $CO_2$ source 52 that introduces $CO_2$ into the working compartment. Typically, $CO_2$ will be bubbled into working compartment 24. Voltage source 54 is configured to negatively bias the working electrode with respect to the counter electrode such that $CO_2$ is reduced to formate.

Typically, electrode support 38 is electrically conductive. In a refinement, the electrode support is composed of carbon.

Still referring to FIG. 1B, electrochemical cell 20 includes reference electrode 60. In this case, voltage source 54 can be a potentiostat.

In another embodiment, a method for reducing $CO_2$ using the electrochemical cell of FIG. 1B. The method includes steps of introducing $CO_2$ into the working compartment of the electrochemical cell and negatively biasing the working electrode with respect to the counter electrode such that $CO_2$ is reduced to formate.

Figure 1C:
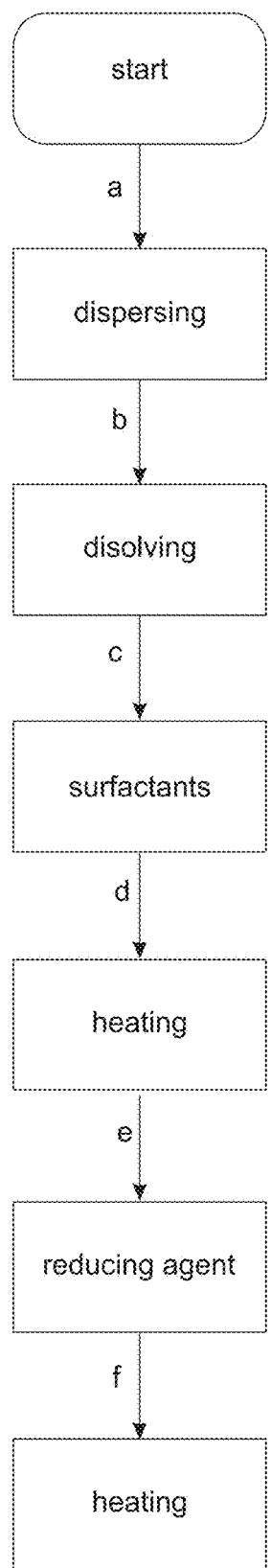
FIG. 1C. Flowchart for forming the supported catalyst of FIG. 1A.

In another embodiment, a method for forming the catalysts supported on substrate particles of FIG. 1A is provided. Referring to FIG. 1C, the method includes step a) of dispersing support particles into an organic solvent and then a step b) of dissolving a palladium-containing compound into the organic solvent to form a first reaction mixture at a first temperature. In step c), one or more surfactants are added to the first reaction mixture to form a second reaction mixture at a second temperature. Any suitable surfactant or mixture of surfactants can be used. In a refinement, the surfactant includes polar functional groups of exemplary surfactants may include one or more of the following elements: nitrogen, oxygen, phosphorus, sulfur, chlorine, bromine and hydrogen. In a refinement, the surfactants may include long chain amines (e.g., having chains 8 or more carbons in length and typically less than 25 carbon atoms), such as oleylamine and hexadecylamine. In a refinement, the surfactants may include long chain carboxylic acids (e.g., having chains 8 or more carbons in length and typically less than 25 carbon atoms) such as oleic acid and 1,2 adamantanecarboxylic acid.

In step d), the second reaction mixture is heated to a third temperature, and then in step e), a reducing agent (e.g. $LiBEt_3H$) is introduced into the second reaction mixture to form a third reaction mixture. The third reaction mixture is heated to a fourth temperature to form a supported catalyst comprising a plurality of support particles; and a plurality of catalyst particles disposed over each support particle, the catalyst particles having formula $PdH_x/C$ wherein x is 0.3 to 0.7. In some refinements, x is at least 0.1, 0.2, 0.3, 0.4, 0.45, or 0.48 and at most least 0.9, 0.8, 0.7, 0.6, 0.55, or 0.52. In a refinement, catalyst particles 14 are described by formula $PdH_{0.5}/C$. Typically, the catalyst particles have an average particle diameter of about 1 to 10 nm. In a refinement, the catalyst particles have an average particle diameter of about 2.5 to 4 nm with an average of about 3.15. Typically, the first temperature is about room temperature (e.g., 20 to 25° C.), the second temperature (e.g., 80 to 120° C.) is greater than the first temperature, the third temperature (e.g., 130 to 170° C.) is greater than the second temperature, and the fourth temperature (e.g., 180 to 230° C.) is greater than the third temperature.

Typically, the palladium-containing compound is $Pd(acac)_2$ and the surfactants are oleylamine and oleic acid. As set forth above, the support particles are carbon particles.

The following examples illustrate the various embodiments of the present invention. Those skilled in the art will recognize many variations that are within the spirit of the present invention and scope of the claims.

1. Experimental Section 1.1. Chemicals

Palladium (II) acetylacetonate ($Pd(acac)_2$, 99%, Sigma Aldrich), Benzyl ether (($C_6H_5CH_2)_2O$, 98%, Sigma Aldrich), Oleylamine (70%, Sigma Aldrich), Oleic acid (≥99%, Sigma Aldrich), LiBEt3H (Li(C2H5)3BH, 1.0 M lithium triethylborohydride in THF), Potassium bicarbonate ($KHCO_3$, 99.97%, Sigma Aldrich), Potassium carbonate (K2CO3, 99.995%, Sigma Aldrich), Deuterium oxide ($D_2O$, 99.9%, Sigma Aldrich), 3-(Trimethylsilyl)-1-propanesulfonic acid sodium salt (DSS, 97%, Sigma Aldrich), AvCarb MGL190 (Fuel Cell Store).

1.2. Catalyst Synthesis

Figure 2A:
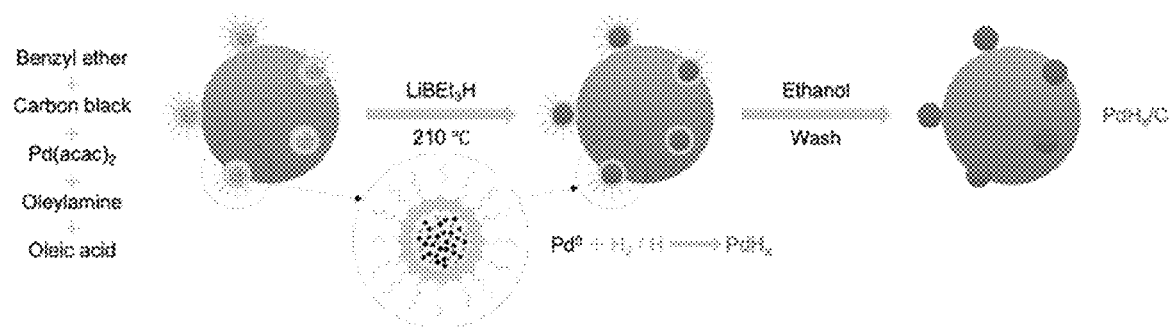
FIGS. 2A, 2B, 2C, 2D, 2E, 2F-1, 2F-2, 2F-3, and 2G. Synthesis and physical structures of Pd—$H_{0.5}$/C catalyst. (A) Schematic one-step solvothermal synthesis of palladium hydride catalyst. (B) Low-magnified TEM image and the size distribution (insert) of $PdH_{0.5}$ nanoparticles on carbon support. (C) High magnitude STEM image and EDS of $PdH_{0.5}$/C catalyst. (D) BF-STEM image of $PdH_{0.5}$ nanoparticles. (E) Pd 3d XPS spectra of $PdH_{0.5}$/C and commercial Pd/C. (F) XRD pattern of $PdH_{0.5}$/C, commercial Pd/C, and annealed commercial Pd/C. Below is the standard XRD pattern for fcc Pd and $\beta$-phase Pd. (G) Temperature programmed desorption with Argon flow for $PdH_{0.5}$/C and commercial Pd/C. The intensity reflects the thermal conductivity difference between inlet and outlet gases.

The $PdH_{0.5}/C$ (20 wt % Pd) catalysts were synthesized through one-step solvothermal synthesis technique as shown in FIG. 2A.[91] Carbon black was dispersed into organic solvent at the beginning of the synthesis in order to reduce the particle agglomeration. 272 mg of Vulcan XC-72R carbon black was dispersed in 160 mL of benzyl ether with stirring at room temperature and then ultrasonication for 30 min. 194.66 mg of $Pd(acac)_2$ were dissolved into the mixture with stirring for 10 min, followed by $N_2$ purging for 30 min at room temperature. The $N_2$ purged uniform mixture was then heated to 100 C, followed by adding 1.6 mL of oleylamine and 0.8 mL of oleic acid. The temperature was held at 100 C for 10 min and then heated to 150 C, followed by quickly injecting 4.0 mL of LiBEt$_3$H into the mixture and holding for 10 min. After quickly heated to 210° C. and held for 45 min, the system was cooled to room temperature. The final products were collected by centrifugation, filtration, washed with ethanol, dried in a vacuum oven at 60° C. for 24 hours, and ground to powder. 10 wt. % commercial Pd/C (noted as commercial Pd/C) purchased from Premetek Co. was used as control.

1.3. Material Characterization

Inductively coupled plasma mass spectrometry (ICP-MS) was used to determine the composition of PdH$_{0.5}$/C catalyst. Aberration-corrected scanning transmission electron microscopy and energy dispersive X-ray spectroscopy (EDS) was performed using a JEOL Grand ARM300F were employed to characterize the morphology, lattice constant, and elemental distribution in the PdH$_{0.5}$/C catalyst. Transmission electron microscopy images were acquired using a JEOL JEM-2800. The surface electronic structures were analyzed using X-ray photoelectron spectroscopy (XPS) from AXIS Supra by Kratos Analytical. The binding energies were calibrated with respect to the C is peak at 285 eV. Crystalline structures and hydride content of catalysts were determined using powder X-ray diffraction (XRD). Temperature programmed desorption (TPD) in Ar environment was employed to help to identify the hydride content in catalysts. The specific surface area of catalysts was measured using Brunauer-Emmett-Teller (BET) theory.

1.4. Electrochemical Measurements

Electrochemical reduction of $CO_2$ was conducted in a glass H-cell with a three-electrode system at room temperature. Counter and working compartments were separated by a Nafion 117 membrane, containing 20 mL and 30 mL of 0.1 M KHCO$_3$ electrolyte (made with Millipore water), respectively. A carbon rod and an Ag/AgCl (3 M KCl, BASi) served as the counter electrode and the reference electrode, respectively. A hand-cut carbon paper (AvCarb MGL190) with a surface area of 1 cm$^2$ was prepared as a working electrode. Carbon paper was pretreated with plasma and acid washing to modify the surface to be hydrophilic. Catalyst ink was prepared by dispersing 2.5 mg of Pd/C in 960 µL of isopropanol and 40 µL of 5 wt % Nafion isopropanol solutions with ultrasonication for 30 min. 100 µL of well-mixed ink was drop-casted onto the pretreated carbon paper electrode to meet a Pd loading of 50 µg/cm$^2$, followed by drying in a vacuum oven at 60° C. overnight. $CO_2$ was purged to both counter and working electrolyte with 30 sccm for 30 min until saturation prior to all electrochemical experiments. $CO_2$ was then continually bubbled into the electrolyte with 30 sccm during all electrochemical experiments for continuous saturation.

The CO stripping method was used to analyze the affinity of CO on the Pd-based catalyst electrode as Pd readily adsorb CO. A monolayer of CO adsorbed on the Pd surface by purging CO into the 0.1 M HClO$_4$ solution for 10 min while holding the potential at 0.05V (vs RHE), followed by introducing Ar for 10 min to passivate the surface and remove superfluous CO in the system. The monolayer of CO already deposited on the surface of Pd is then electrochemically oxidized by sweeping potential from 0.05V to 1.5V at a scan rate of 5 mV/s. The total charge of CO oxidation can be derived by integrating the area between peak curve and baseline, in which the baseline is obtained from CV in Ar-saturated 0.1 M HClO$_4$ with the same scan rate. Electrochemically active surface area (ECSA) can be calculated by dividing the charge by the conversion factor (420 µC/cm$^2$).

1.5. Product Quantification

The liquid products derived from electrolysis at constant potentials for 1 hour in the 0.1 M KHCO$_3$ electrolyte were quantified by a Bruker CRYO 500 MHz nuclear magnetic resonance (NMR) spectroscopy instrument. Deuterium oxide (D$_2$O) and 3-(trimethylsilyl)-1-propanesulfonic acid sodium salt (DSS) were used as locking solvent and internal standard, respectively. The NMR test sample was the mixture of 500 µL of post-electrolysis electrolyte, 100 µL of D$_2$O, and 100 µL of 6 mM DSS (made with Millipore water). A solvent suppression method was applied to restrain the signal from H$_2$O for better accuracy. The $^1$H-NMR spectrum was processed and analyzed on Topspin 4.0.8 software.

The faradaic efficiency (FE) of products from $CO_2$ reduction was calculated from the following equation:

$$FE = ZFVC/Q \times 100\%$$

where Z is the number of electrons transferred to obtain 1 molecule of a specific product such as 2 for formate, F is the Faraday's constant (96485 C/mol), V is the total volume of catholyte in L, C is the concentration of catholyte measured from NMR analysis in mol/L. Q is the total charge passed during the bulk electrolysis in C.

2. Results and Discussion

2.1. Formation and Structure of Ultrafine Pd—H$_{0.5}$ Nanoparticles

Figure 10:
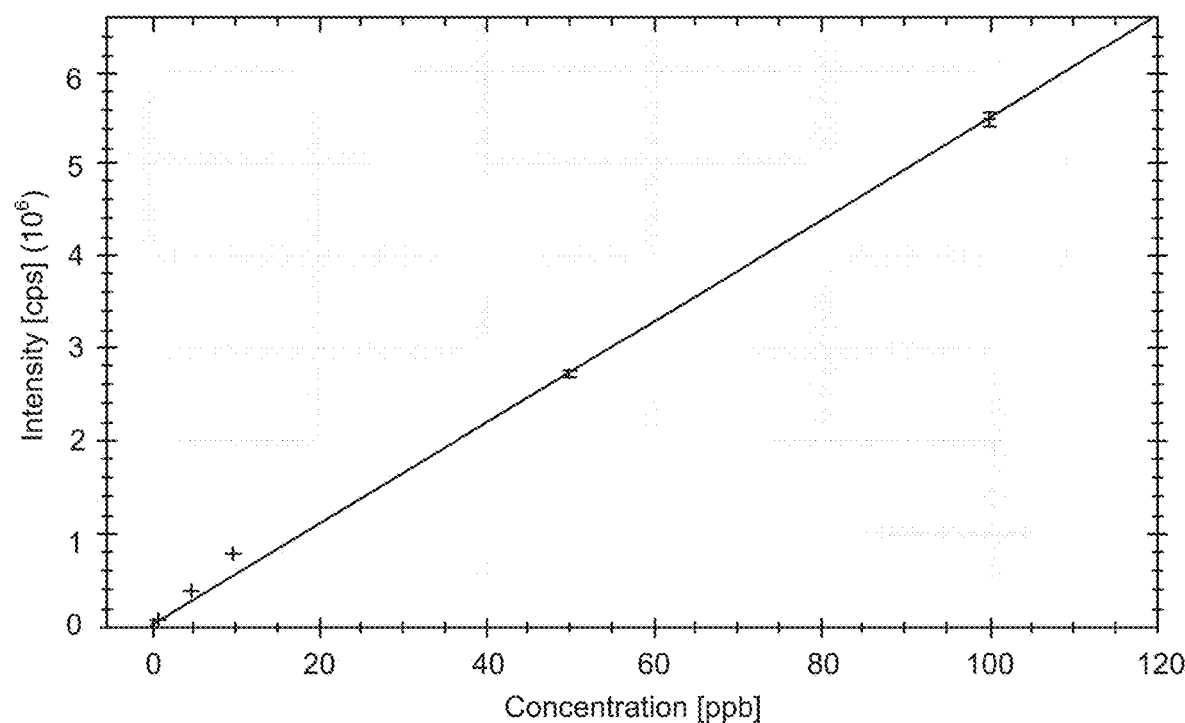
FIG. 10. ICP-MS calibration curve for Pd.
Figure 11A:
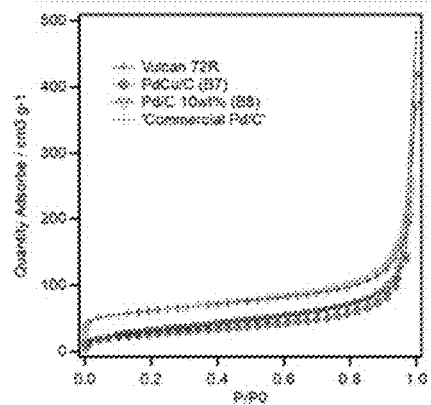
FIGS. 11A, 11B, 11C, and 11D. BET results of Valcan carbon, $PdH_{0.5}/C$, and Commercial Pd/C.
Figure 11B:
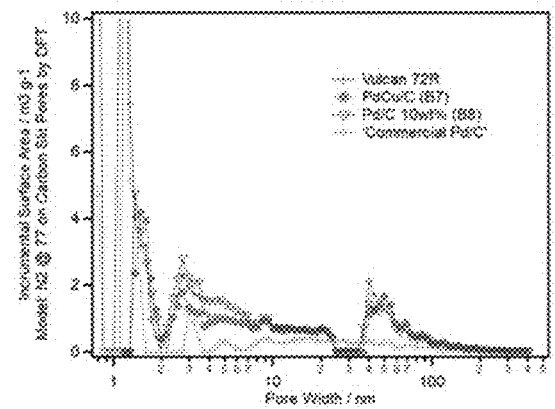
Figure 11C:
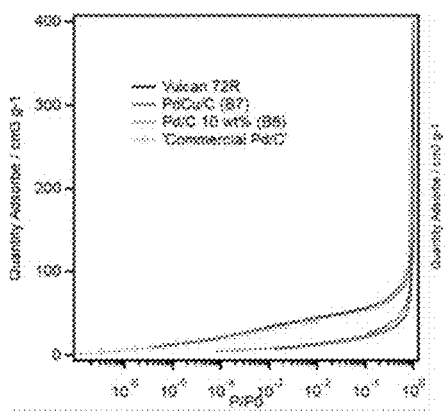
Figure 11D:
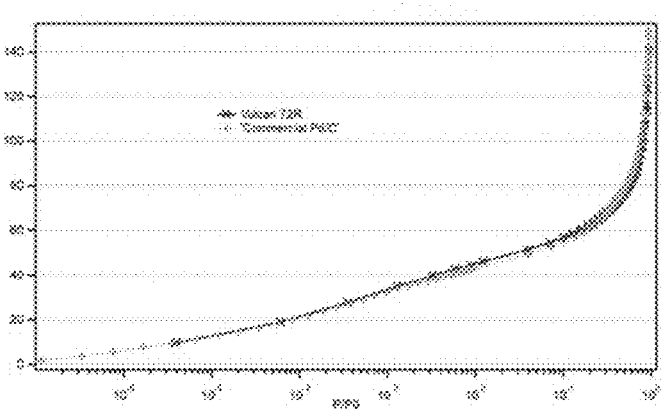
Figure 12A:
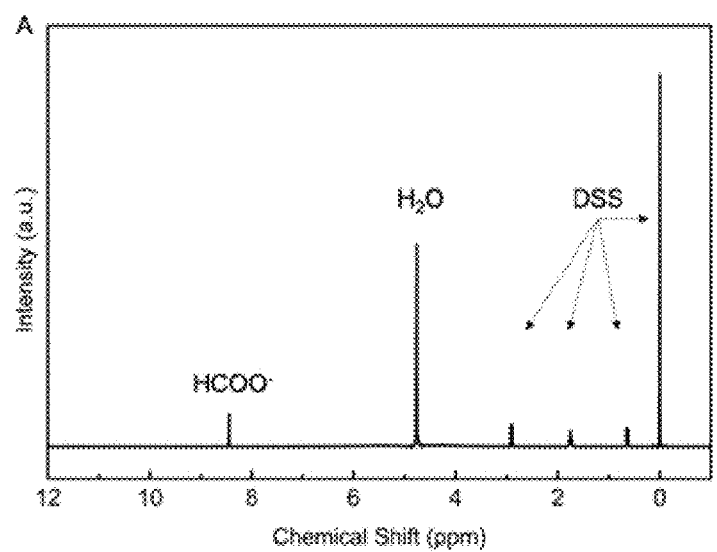
FIGS. 12A and 12B. (A) $^1$H-NMR spectrum of the electrolyte sample after 4 hours $CO_2$ reduction test at –0.4V in $CO_2$-saturated 0.1 M $KHCO_3$ for $PdH_{0.5}/C$. DSS is used as the internal standard. (B) $^1$H-NMR calibration curve for formate based on the peak area ratio of formate (~8.5 ppm) and DSS (~0 ppm).
Figure 12B:
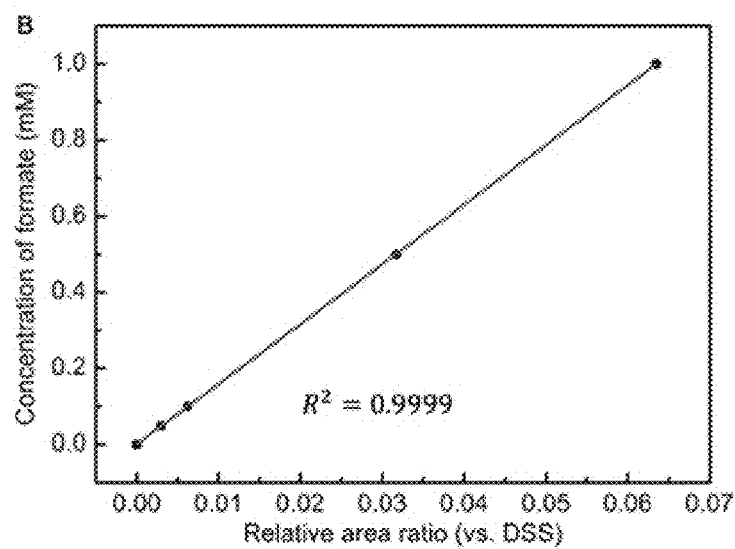

FIG. 2A illustrates the formation of PdH$_{0.5}$/C nanoparticles using a solvothermal synthesis. The precursor Pd(acac)$_2$ was encapsulated in the reverse micelles formed by the introduction of stabilizer and surfactant (oleylamine and oleic acid). The nanocapsules provided a hydrogen-rich environment for Pd reduction after the insertion of the reducing agent into the mixture, promoting the formation of Pd hydride. The use of organic moieties with limited reaction space prevented nanoparticles from aggregation, resulting in homogenously dispersed nanoparticles with uniform composition.[92,93] As result, a Pd loading of 17.5 wt. % was achieved for PdH$_{0.5}$/C catalyst as determined by ICP-MS (FIG. 10). In addition, the resulting catalyst had a BET surface area of 109 m$^2$/g as compared to the 208 m$^2$/g for its carbon precursor (Vulcan XC-72R) as shown in FIG. 11.

Figure 2B:
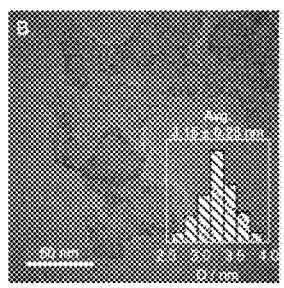
Figure 2C:
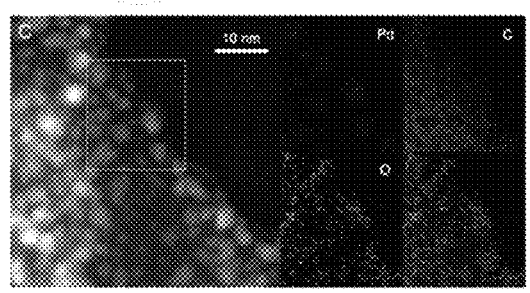
Figure 2D:
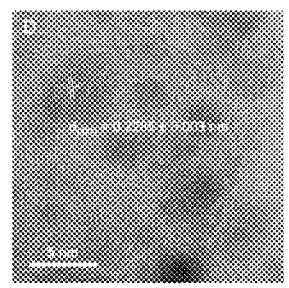
Figure 8C:
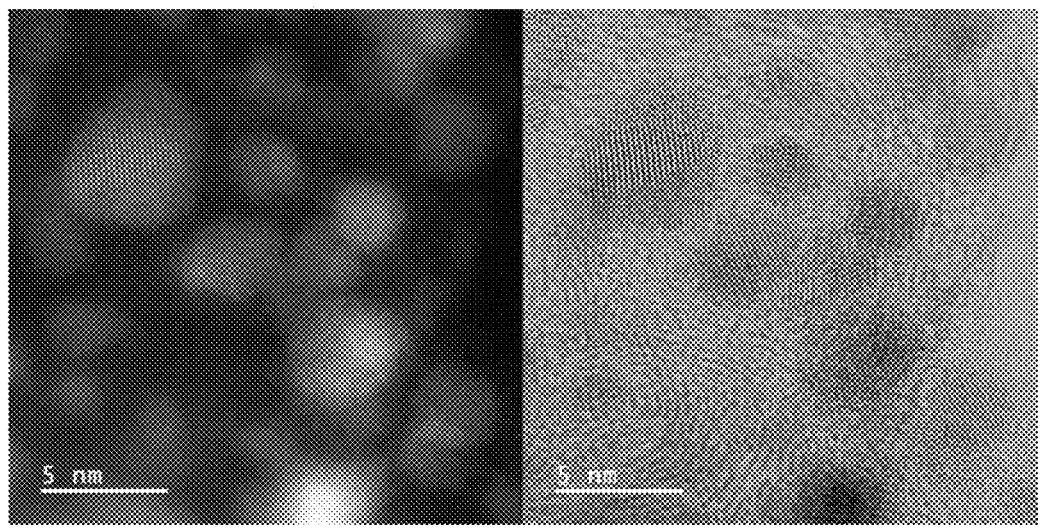
Figure 8C:
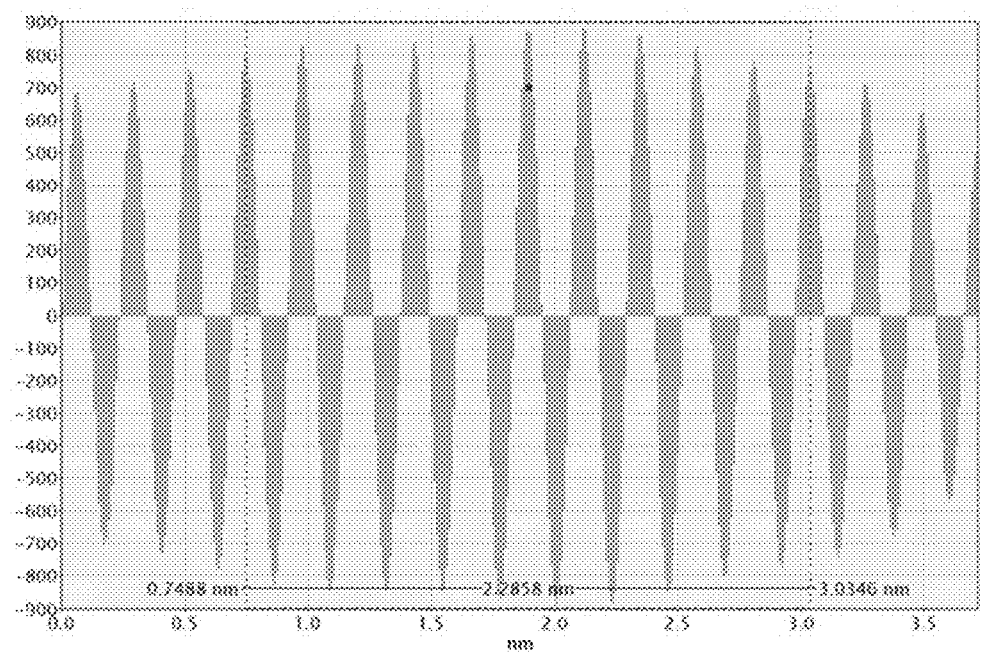

FIG. 2B shows a representative TEM image of the PdH$_{0.5}$/C catalyst, revealing a homogenous dispersion of Pd nanoparticles with a particle diameter of ca. 3.15±0.28 nm. Such particle diameter could accommodate 2-4 grains in a single nanoparticle. STEM HAADF image and corresponding energy dispersive X-ray spectroscopy (EDS) element mapping indicate well-controlled Pd nanoparticles on carbon matrix as shown in FIG. 2C. The average spacing distance of lattice fringes for PdH$_{0.5}$/C was measured to be 0.2285±0.003 nm, which was assigned to the (111) plane (FIG. 2D and FIG. 8). This enlarged interplanar distance for PdH$_{0.5}$/C indicates the lattice expansion due to intercalation of metallic hydrogen atoms. Furthermore, a lattice constant of 0.3958 nm can be calculated from the lattice spacing of the (111) plane, which is 1.8% larger than that of 0.3889 nm for pure Pd87.

Figure 2E:
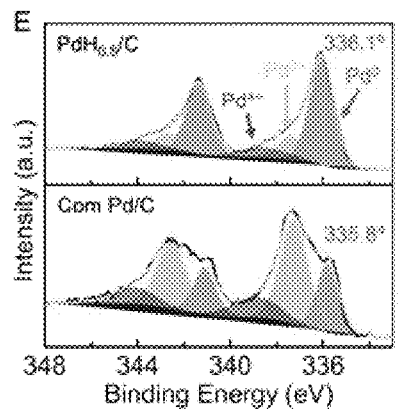

X-ray photoelectron spectroscopy (XPS) was carried out to determine the oxidation state of PdH0.5/C. The XPS spectra of Pd 3d peak region for PdH$_{0.5}$/C and commercial Pd/C are presented in FIG. 2E, showing 3d5/2 and 3d3/2 doublets because of spin-orbit coupling. After peak deconvolution, three pairs of doublets associated with the Pd$^0$, Pd$^{2+}$, and Pd$^{4+}$ valence states can be differentiated. The predominant species for PdH$_{0.5}$/C is metallic Pd$^0$, whereas oxidized Pd$^{2+}$ is the main species for commercial Pd/C, indicating inevitable oxidation of Pd from an aging exposure to the air during the storage for commercial catalysts, which can be lightly reduced to Pd$^0$ under CO$_2$ reduction potentials. The Pd$^0$ peak for PdH$_{0.5}$/C centered at 336.1 eV, which is 0.3 eV higher than that of commercial Pd/C, indicates a partial electron transfer of Pd valance electrons to hydride and a downshifted d-band center of Pd, further demonstrating the modified electronic structure and the insertion of hydride.[89,94]

Figures 1, 2, 2F, 3:
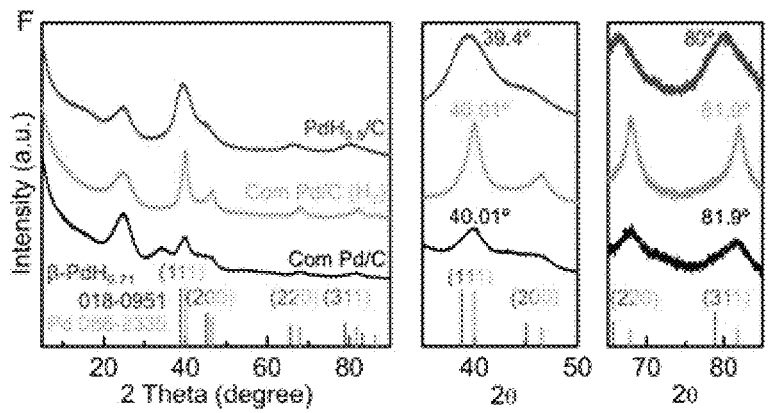
Figure 2G:
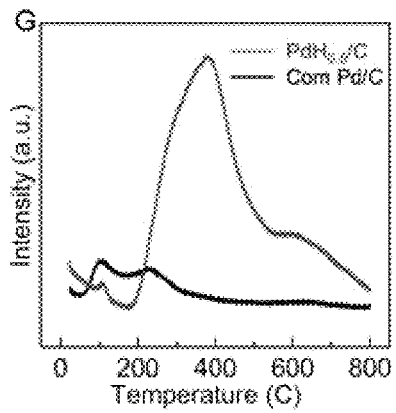
Figure 3:
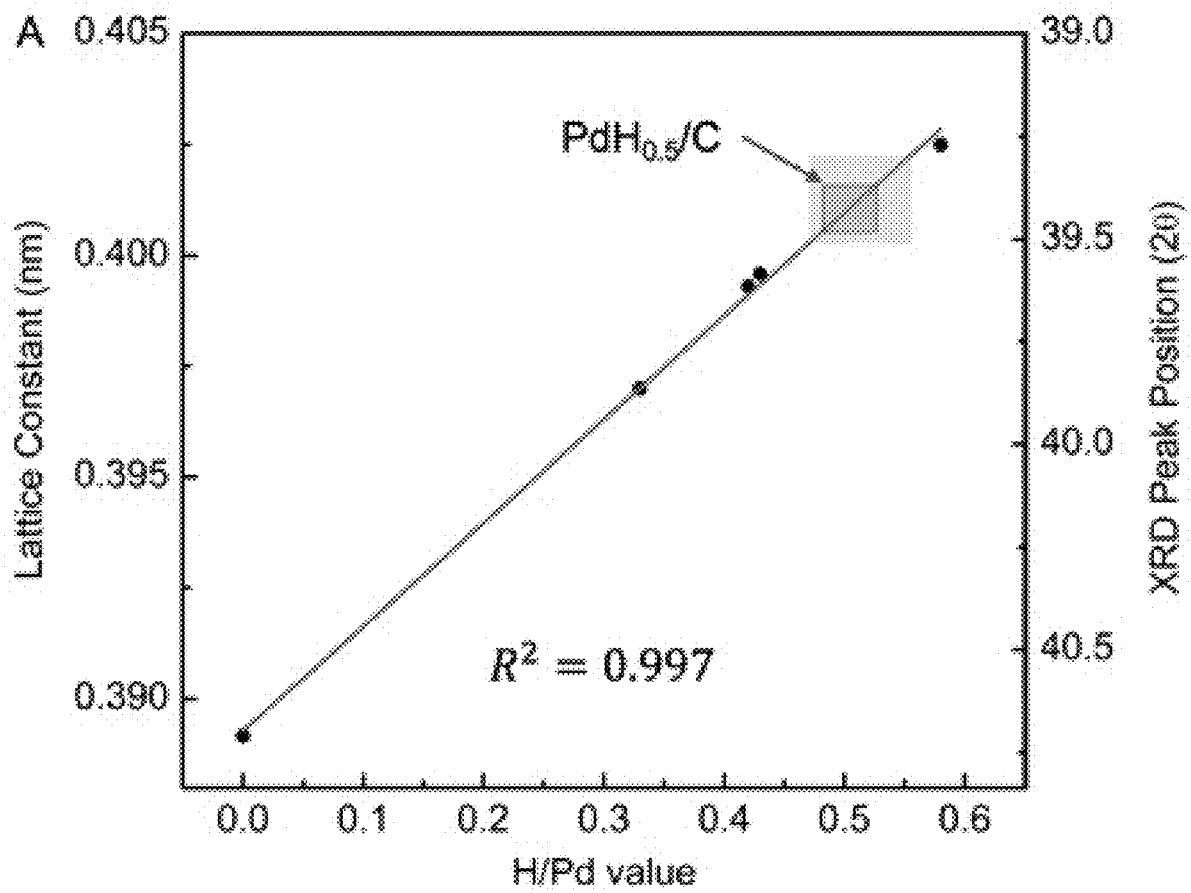
Figure 17:
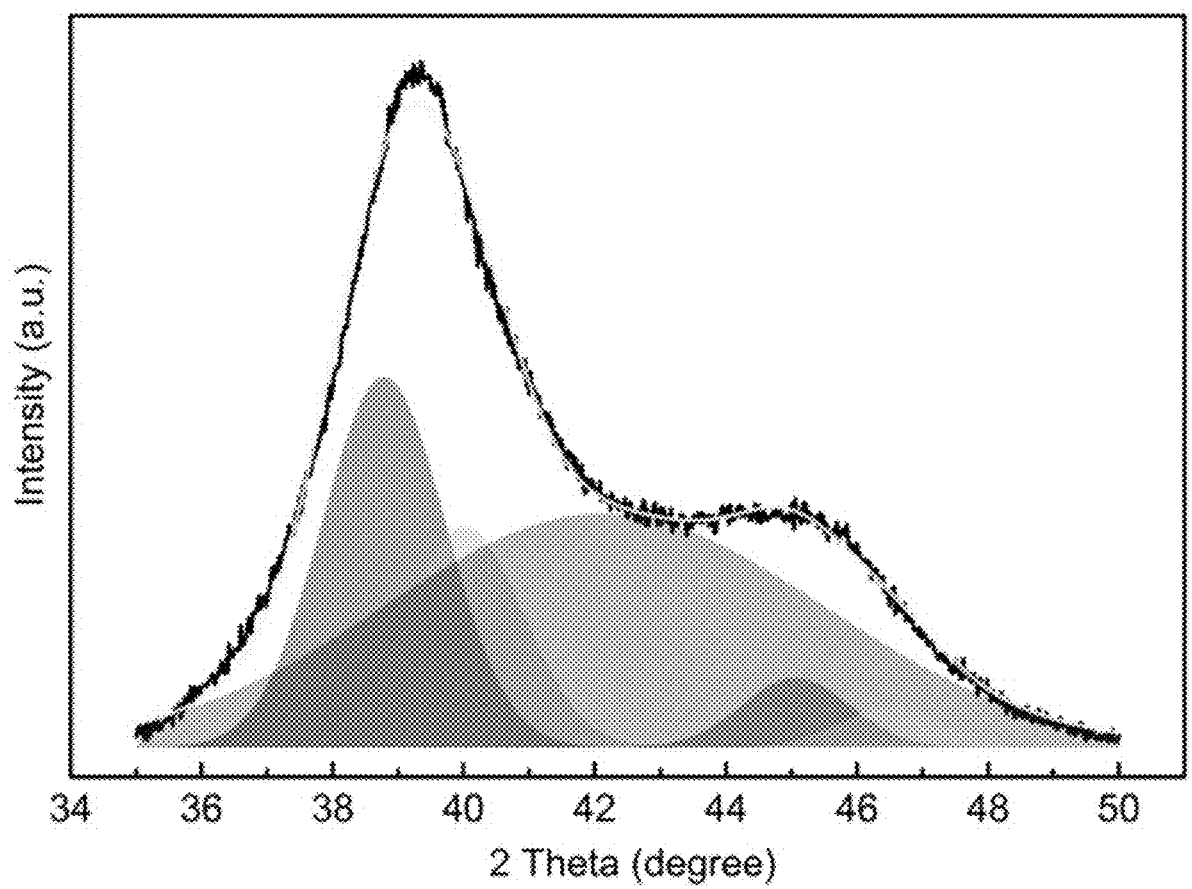
FIG. 17. Peak deconvolution of XRD from 35 to 50 degree. Peaks centered at 38.784 (red), 40.01 (green), 41.156 (blue), 45.056 (red), and 46.535 (green) are assigned to β-Pd(111), Pd(111), amorphous, β-Pd(200), and Pd(200), respectively.

The crystal structure of PdH$_{0.5}$/C, commercial Pd/C, and commercial Pd/C (H$_2$) is determined by powder XRD as shown in FIG. 2F. Owing to the small particle size, only broad peaks are shown in the XRD pattern, which is well-indexed to Pd(111), Pd(200), Pd(220), and Pd(311) planes. A negative shift was observed for PdH$_{0.5}$/C compared to the commercial Pd/C and standard data, such as the Pd(111) peak at 394° opposed to 40° and the Pd(311) peak at 80° comparing to 81.9°, suggesting a swelled Pd—Pd lattice by the insertion of hydride in the interstices[89,94,95], which is consistent with TEM data. Peak deconvolution for PdH$_{0.5}$/C from 35° to 50° is conducted to further analyze the composition (FIG. 17), in which five peaks at 38.784°, 40.01°, 42.156°, 45.068°, and 46.535° correspond to β-PdH (111), Pd(111), amorphous, β-PdH(200), and Pd(200) respectively, indicating that PdH$_{0.5}$/C is rich in β-phase palladium hydride. Moreover, the Ar-TPD showed a sharper intensity for PdH$_{0.5}$/C over commercial Pd/C, indicating a large amount of H$_2$ gas released from Pd hydride upon elevated temperature (FIG. 2G).

FIG. 3 describes the linear fitted relationship between the lattice constant of bulk Pd and H content according to literatures[96-99], which is used to quantify the exact content of lattice hydrogen in our catalyst. After the consideration of lattice contraction in lattice constant due to surface tension as a result of the small particle size[95], which causes ~1.35±0.013% shrink to lattice constant for our PdHx/C catalyst compare to bulk Pd[100,101], the hydride content can be indicated to x value of 0.5±0.02 by the XRD peak shift (Pd111) according to Bragg's law (blue shadow) 102, as well as an x value of 0.51±0.04 from TEM data (green shadow). The integrated purple rectangular area in FIG. 3 shows the overlapping range between XRD and TEM measurement techniques. Given the global sampling nature of XRD and the overlapping region, the palladium hydride catalyst in this work is denoted as PdH$_{0.5}$/C.

2.2. Electrochemical HCOO Formation

Figures 1, 2, 3, 4A:
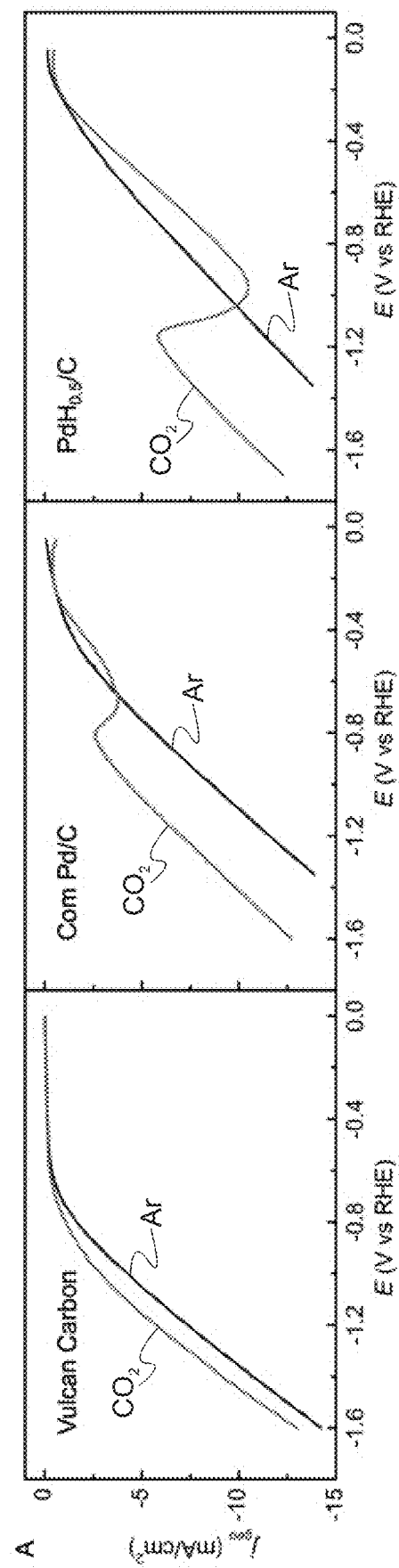
Figure 4B:
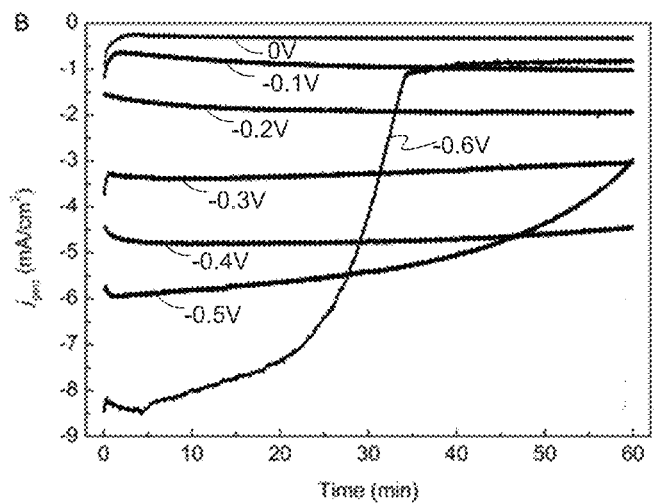
Figure 4C:
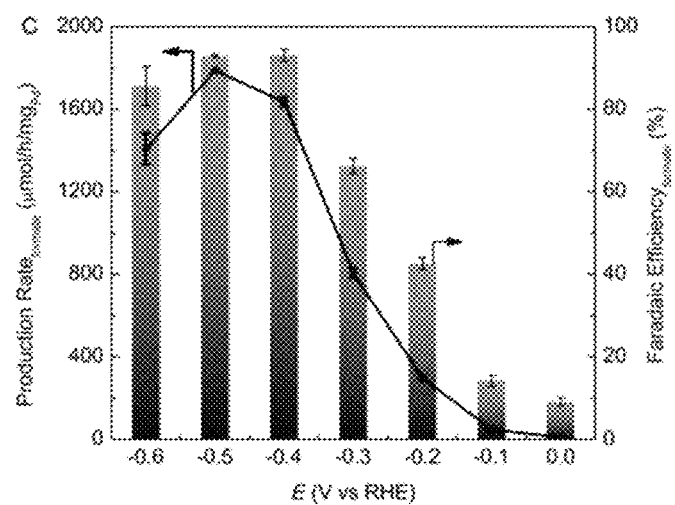
Figure 13A:
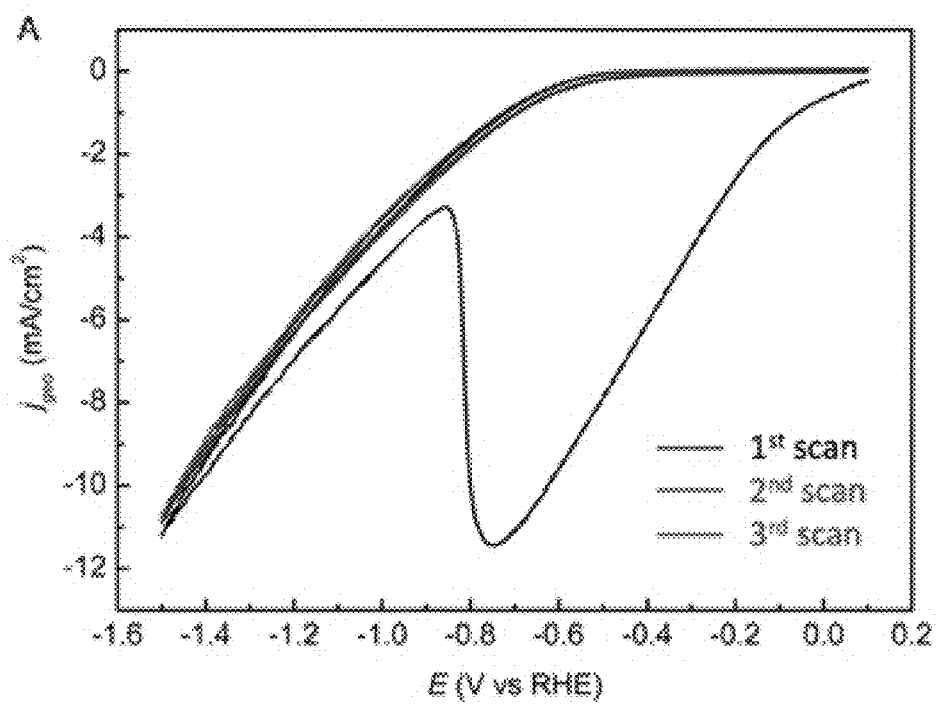
FIGS. 13A and 13B. Cyclic voltammetry (CV) for $PdH_{0.5}/C$ in $CO_2$-saturated 0.1 M $KHCO_3$ solution within (A) negative potential range and (B) full potential range. Recorded at 5 mV/s.

Cathodic linear sweep voltammetry (LSV) is recorded at 5 mV/s for PdH$_{0.5}$/C and commercial Pd/C casted on a carbon paper electrode in Ar- and CO$_2$-saturated 0.1 M KHCO$_3$ electrolyte as shown in FIG. 4A. Baseline LSVs for carbon black casted on the carbon paper electrode in the same electrolyte is also presented in FIG. 4A, suggesting that only hydrogen evolution reaction occurs on Pd-free carbon black electrodes, because of the minimum difference between Ar and CO$_2$ purging. A significant increase in the current density is observed on PdH$_{0.5}$/C and commercial Pd/C in Ar- and CO$_2$-saturated 0.1 M KHCO$_3$ solution compared to baseline LSV, indicating the important role of Pd in electrocatalysis. Meanwhile, a difference in the current density between Ar- and CO$_2$-saturated electrolytes for PdH$_{0.5}$/C and commercial Pd/C to indicate that CO$_2$ reduction is occurring rather than just HER. Four potential regions can be identified on the CO$_2$-saturated LSV for PdH$_{0.5}$/C and commercial Pd/C. Under a potential range more positive than −0.2 V (vs RHE), a small difference on the cathodic current between in Ar- and CO$_2$-saturated 0.1 M KHCO$_3$ indicates low activity of CO$_2$ reduction if any. The apparent cathodic current increases with more negative reductive potential, forming an obvious reduction peak in CO$_2$-saturated 0.1 M KHCO$_3$ solution, suggesting a significant CO$_2$ reduction activity on Pd-based catalysts. The CO$_2$ reduction peaks of both catalysts start from −0.2 V, while the maximum values of PdH$_{0.5}$/C and commercial Pd/C are at −0.97 V and −0.66 V, respectively, which is indicative of a larger CO$_2$ reduction window for PdH$_{0.5}$/C compared to commercial Pd/C. The drop of current after the peak is mainly attributed to the limited transport of CO$_2$, which suggests a rapid CO$_2$ reduction process for Pd-containing catalysts. CO poisoning is another possible factor contributing to the post-peak current drop. During the first scan, the catalyst surface can be occupied by CO, resulting in the loss of catalytic sites and current. This surface deactivation is also supported by the disappearance of the CO$_2$ reduction peak in the second scan of CV as shown in FIG. 13A. In return, a higher peak value of current for PdH$_{0.5}$/C also imply a better CO tolerance compared to commercial Pd/C. At potentials more negative than −1.16 V for PdH$_{0.5}$/C and −0.82 V for commercial Pd/C the current in CO$_2$-saturated electrolyte resumes the increasing trend but with a lower value than that in Ar-saturated electrolyte, suggesting a decrease of overall active sites and suppression of H$_2$ evolution by CO$_2$ reduction process in the high overpotentials region 103. To evaluate the CO$_2$ reduction activity, the synthesized PdH$_{0.5}$/C is electrochemically tested in CO$_2$-saturated 0.1 M KHCO$_3$ electrolyte with a pH of 6.8 in a H-cell. The chronoamperometry (CA) curves at various applied potentials for 1 hour are shown in FIG. 4C, as well as the corresponding faradaic efficiency and yield rate for formate are shown in FIG. 4D. The negligible decay of current density at −0.4 V and above indicates a stable electrocatalytic process, whereas a notable decrease of current density at −0.5 V and below suggests a further diminishing behavior of CO$_2$ reduction at higher potentials owing to CO poisoning. The highest faradaic efficiency for formate (FE formate) of 93.1% is observed at −0.4 V (vs RHE), followed by 92.9% at −0.5 V, manifesting a potential-dependent CO$_2$ reduction to formate performance for PdH$_{0.5}$/C. The Pd mass normalized yield rate for formate reaches a record 1787.7 μmol/h/mgPd at −0.5 V, followed by 1636.4 μmol/h/mgPd at −0.4 V.

2.3. Stability and CO Tolerance

Figure 5A:
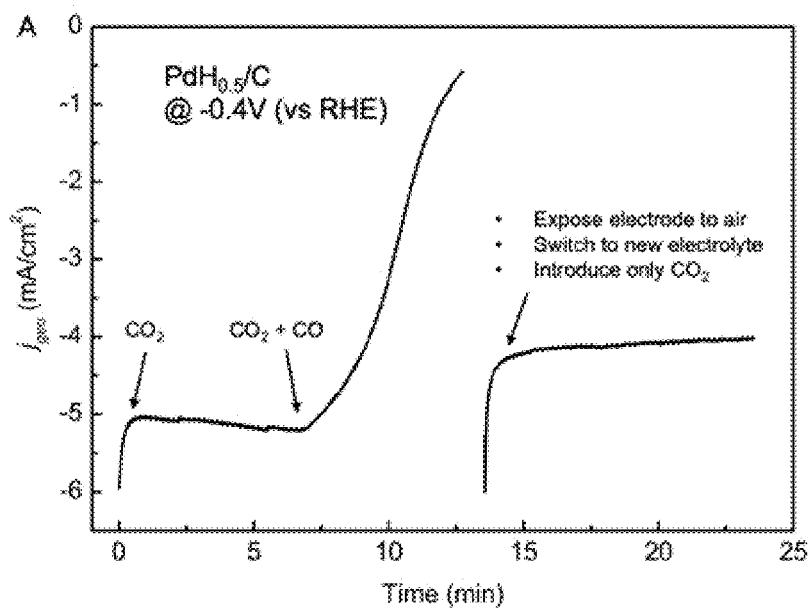
FIGS. 5A, 5B, and 5C. Stability and CO tolerance study of $PdH_{0.5}/C$ catalysts. (A) Artificially introduced CO poisoning of catalyst surface in the electrocatalysis for $PdH_{0.5}/C$ at –0.4V vs. RHE in $CO_2$-saturated 0.1 M $KHCO_3$ electrolyte—CO was purged at t=6 mins, followed by a recovery of electrolysis by exposing the working electrode to air. [ref, Kanan] Then, the $CO_2$ reduction was restarted at –0.4V (vs RHE) at t=12 mins in fresh $CO_2$-saturated 0.1 M $KHCO_3$ solution. (B) CO stripping for $PdH_{0.5}/C$ (red) and commercial Pd/C (black) in 0.1 M $HClO_4$ solution. The insert was the deconvolution of CO oxidation peak for $PdH_{0.5}/C$ with their area ratios. (C) Stability test at –0.4V (vs RHE) in 0.1 M $KHCO_3$ for $PdH_{0.5}/C$ (red) and Com Pd/C (black). Below are the TEM images and XPS spectrum for $PdH_{0.5}/C$ electrode before and after the electrolysis, showing well-maintained lattice constant (through above 20 particles statistics). The nanoparticle showed consistent size with certain non-coarsening agglomeration.

To assess the CO poisoning process, CO gas was artificially introduced into the system in the middle of CO$_2$ reduction process.[55] As shown in FIG. 5A, CO$_2$RR on PdH$_{0.5}$/C was initiated at −0.4 V in CO$_2$-saturated 0.1 M KHCO$_3$ with a current density around 5 mA/cm$^2$. After 6 min, a gas mixture of CO and CO$_2$ was introduced, causing the cathodic current density to immediately decline to a near-zero level within 5 min. The CO poisoned electrode was then cleaned by being exposed to air, since the $O_2$ in air can react and oxidize adsorbed CO.[104-106] The new cleaned electrode was then re-inserted into fresh, $CO_2$ purged electrolyte, which exhibited a recovered current density around 4 mA/cm$^2$ (FIG. 5A). This CO poisoning study, along with previous work demonstrates the detrimental effect of CO on Pd-based catalysts, including our $PdH_{0.5}$/C.[55,77]

Figure 5B:
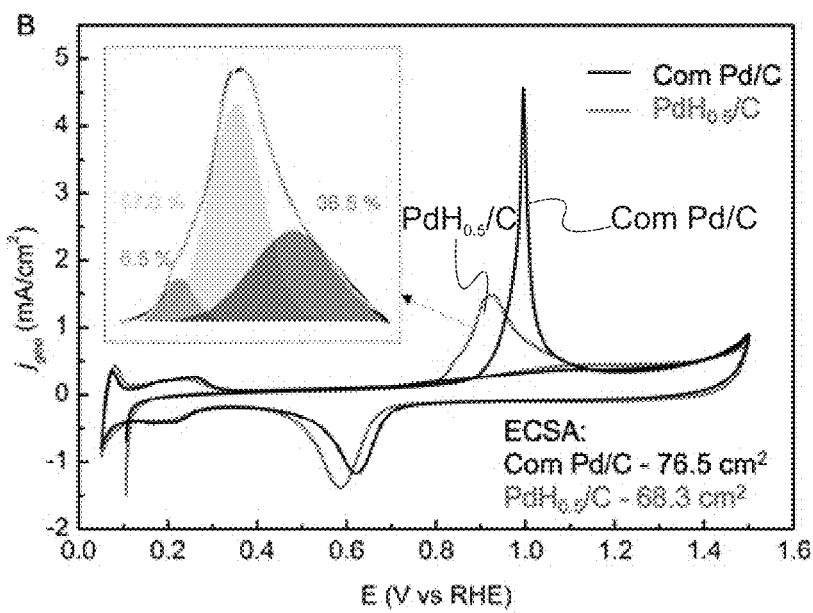
Figure 7A:
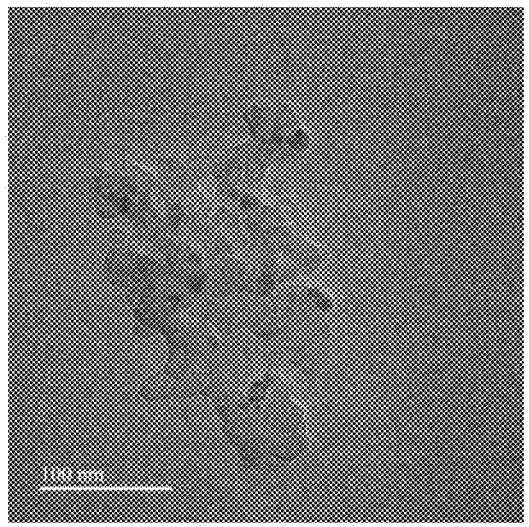
FIGS. 7A and 7B. TEM images of Commercial Pd/C.
Figure 7B:
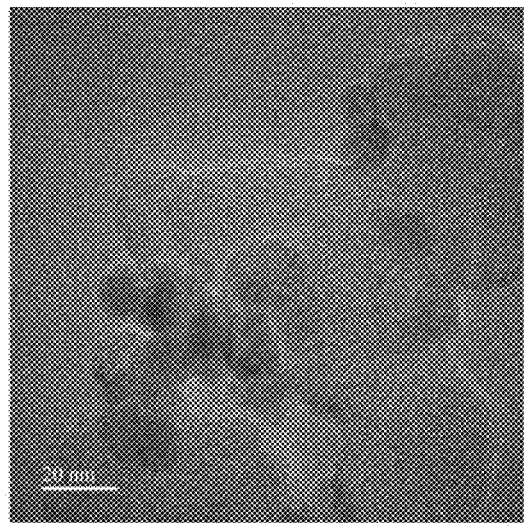

CO stripping was employed to further investigate the CO affinity on $PdH_{0.5}$/C catalyst. As shown in FIG. 5B, the onset potential of CO oxidation for $PdH_{0.5}$/C is at ca. 0.8 V, which is lower than that of ca. 0.9 V for commercial Pd/C, indicating a weaker CO binding strength and thus higher CO tolerance on $PdH_{0.5}$/C as compared to commercial Pd/C. Further deconvolution of CO oxidation peak on $PdH_{0.5}$/C was applied to investigate the effect on different active sites, as shown in the insertion figure of FIG. 5B. The three peaks centered from high to low potential can be assigned to terrace, step, and kink or exposed grain boundaries sites, indicating a decreasing CO adsorption strength on these active sites.[107,108] The area ratio of 36.5%, 57%, and 6.5% for terrace, step, and kink or grain boundaries, respectively, suggests that there are abundant step sites and a noteworthy amount of kink sites in $PdH_{0.5}$/C, which was consistent with the minute size of nanoparticles from TEM images. Also, the kink sites might include grain boundaries exposed on the particle surface. The terrace peak position of 0.989 V on $PdH_{0.5}$/C was closed to the CO oxidation peak position of 0.995 V on commercial Pd/C, indicating that commercial Pd/C contains mainly the terrace sites, which matches the large particles (above 10 nm diameter) for commercial Pd/C seen in the TEM image (FIG. 7). The electrochemically active surface area (ECSA) calculated from CO stripping for $PdH_{0.5}$/C (68.3 cm$^2$) and commercial Pd/C (76.5 cm$^2$) were comparable.

Figure 5C:
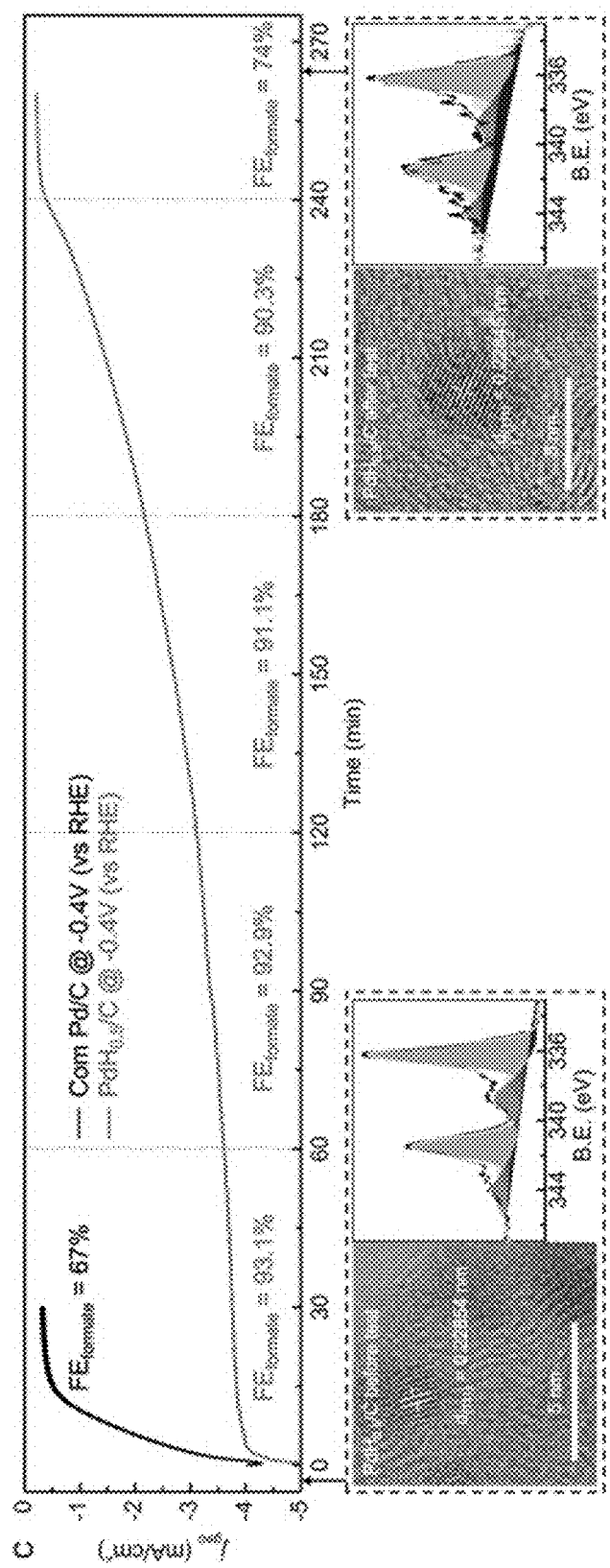

Long duration $CO_2$RR stability tests for $PdH_{0.5}$/C and commercial Pd/C in $CO_2$-saturated 0.1 M $KHCO_3$ at −0.4V are shown in FIG. 5C. The chronoamperometric value and corresponding average faradaic efficiency for formate over different operating periods reveal that $PdH_{0.5}$/C possesses the ability of steadily producing formate with high faradaic efficiency over 90% for 240 min, which is over 15 times longer than that of 15 min for commercial Pd/C. As shown in Table 1, this outstanding stability and activity of $CO_2$ reduction to formate with low Pd loading (ca. 50 µg) outperforms all reported Pd catalysts to the best of our knowledge[55,75,79-83,109,110], demonstrating advanced CO tolerance for $PdH_{0.5}$/C. After 240 min, the current density decreased to a plateau but was still generating formate with a faradaic efficiency as high as 74% despite the low current density (0.25 mA/cm$^2$). One possible explanation could be the still working kink site in $PdH_{0.5}$/C, as it showed the lowest CO binding strength in CO stripping analysis (FIG. 5B). Particularly, the area ratio of 6.5% for the kink site was in good agreement with the residual current density ratio (6.25%) to the initial value (4 mA/cm$^2$), further implying the high probability of the continued reduction of $CO_2$ on the kink sites, which might be immune to CO poisoning although there was no direct evidence and further research is necessary.

TABLE 1

| | | | Comparison with reported Pd based electrocatalysts | | | |
|---|---|---|---|---|---|---|
| Catalyst | E (V) | Durability (min) | FEHCOO- (%) | jtotal (mA/cm2) | jHCOO- (mA/cm2) | Loading (µgPd/cm2) | Ref |
| Pd/Ti | −0.35 | 20 | 95% | 5.5 | 5.23 | 50 | 2015 |
| commercial | | 160 | 30% | 1.2 | 0.36 | | Kanan |
| Pd70Pt30/C | −0.4 | 10 | 79% | 5.8 | 4.6 | 73 | 2015 |
| | | 120 | 58% | 3.6 | 2.07 | | Marc Koper |
| Pd | −0.2 | 0 | -- | 22 | -- | 83,333** | 2016 |
| high index | | 60 | 97% | 20 | 19.4 | | Sargent |
| Pd/C | −0.3 | 2 | -- | 25 | -- | 50 | 2017 |
| | | 10 | 95% | 1 | 0.95 | | Xinhe Bao |
| Pd-B/C | −0.5 | 30 | 80% | 4.5 | 3.6 | 100 | 2018 |
| | | 300 | 55% | 3.5 | 1.93 | | Wen-Bin Cai |
| Pd/C | −0.425 | 0 | -- | 16 | -- | 85.7 | 2019 |
| | | 4 | 75% | 1.5 | 1.13 | | Joshua Snyder |
| PdH0.5/C | −0.4 | 60 | 93% | 3.7 | 3.44 | 50 | ours |
| | | 120 | 93% | 3.2 | 2.97 | | |
| | | 180 | 91% | 2.2 | 2 | | |
| | | 240 | 90% | 0.4 | 0.36 | | |
| | | 330 | 70% | 0.25 | 0.18 | | |

**High or surplus Pd loadings result in a diffusion limited formate formation, wherein the CO poisoning gradually takes place on unused Pd surface. This electrode set-up could show stable current and even FE before all extra Pd functionalizes. Please see Figure S8 for a CA test on electrode with 4-fold Pd loading.

The TEM images and XPS spectrum (FIG. 5C insert) for $PdH_{0.5}$/C before and after the electrolysis showed well-maintained lattice constant and thus lattice hydrogen concentration. Also, the PdH nanoparticles almost maintained a consistent size with certain non-coarsening agglomeration.

Figure 6A:
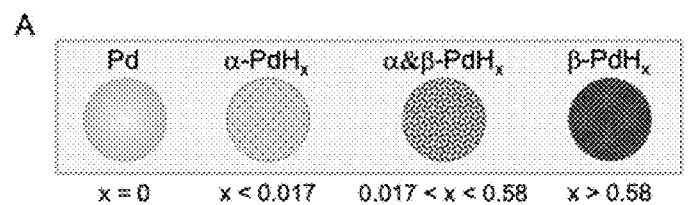
Figures 1, 6B:
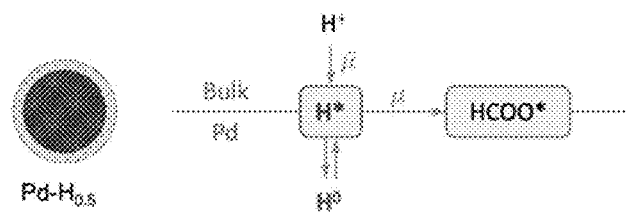
Figures 2, 6B:
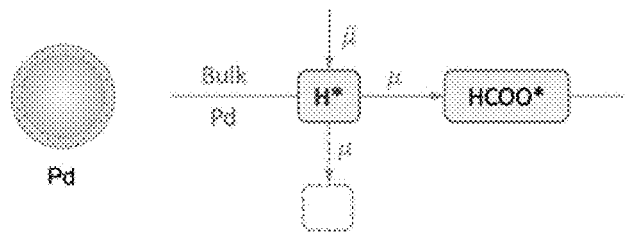
Figure 9:
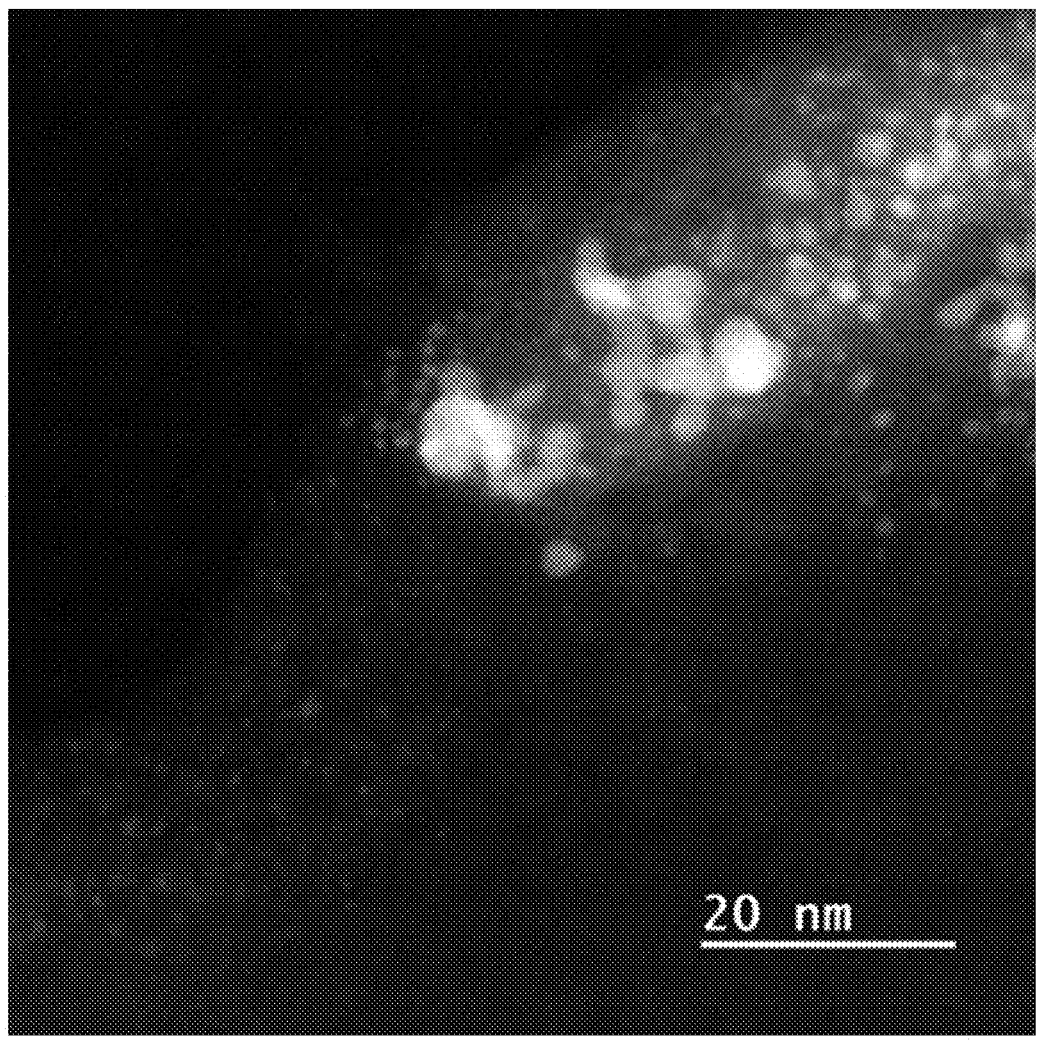
FIG. 9. HRTEM HAADF image of $PdH_{0.5}/C$ after 4 hours $CO_2$ reduction test at –0.4V in $CO_2$-saturated 0.1 M $KHCO_3$.
Figure 13B:
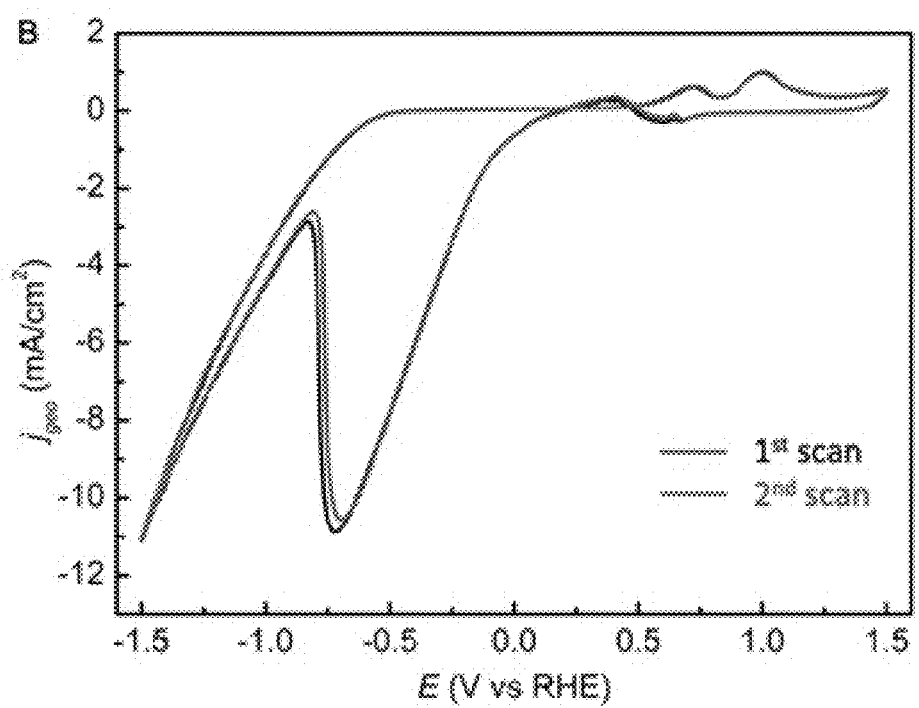
Figure 14:
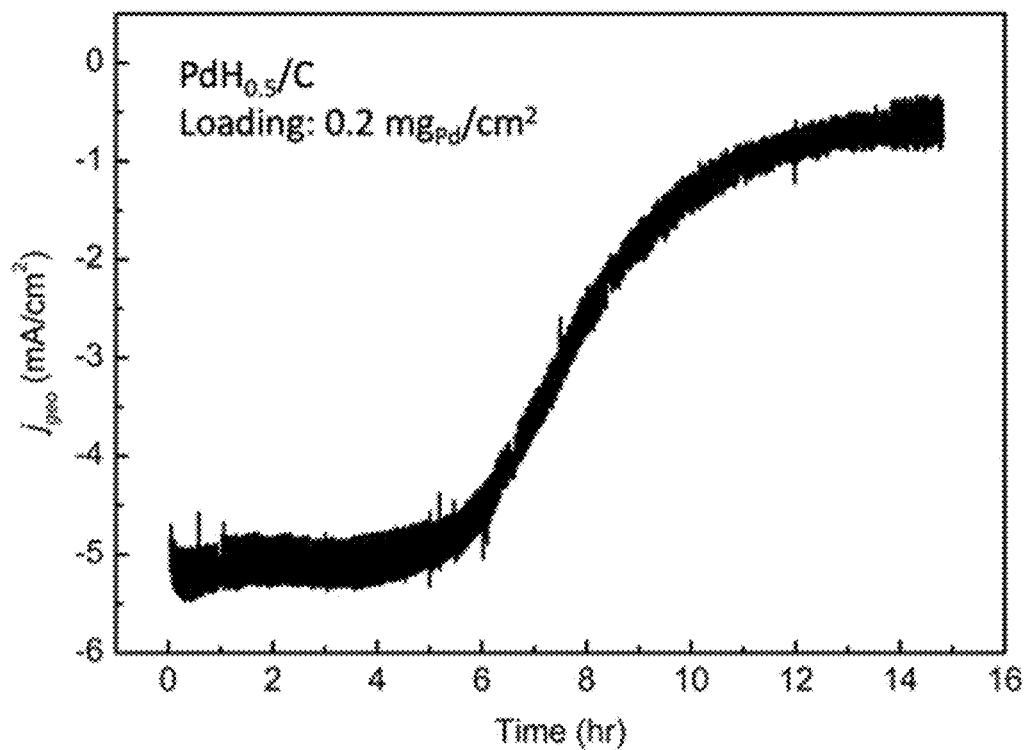
FIG. 14. Chronoamperometry (CA) of $CO_2$ electrolysis for $PdH_{0.5}/C$ with loading of 1 mg/cm2 (0.2 mgPd/cm2) at –0.4V in $CO_2$-saturated 0.1 M $KHCO_3$.
Figures 1, 15A:
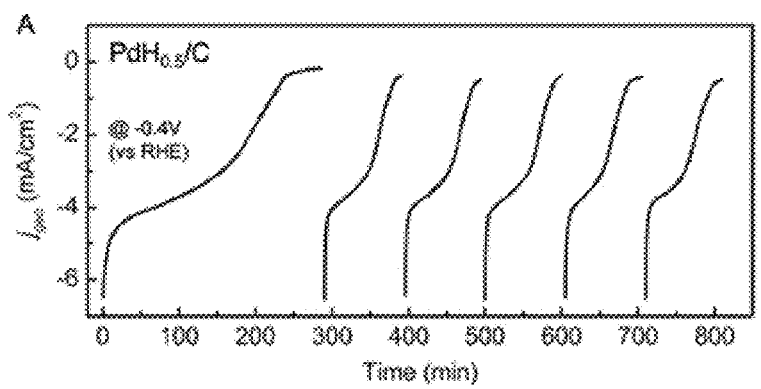
Figures 2, 15A:
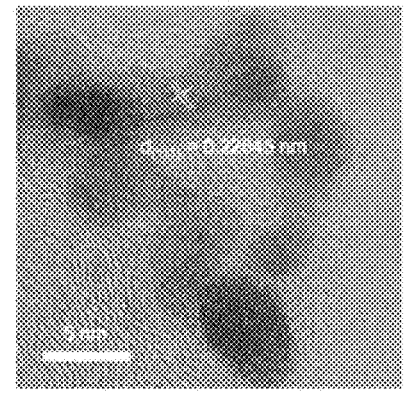
Figures 1, 15B:
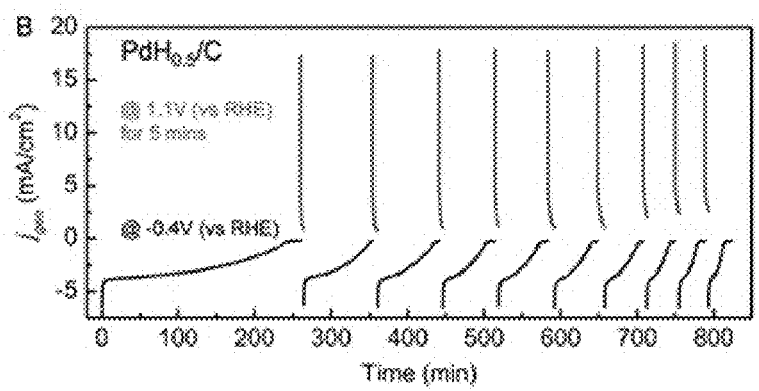
Figures 2, 15B:
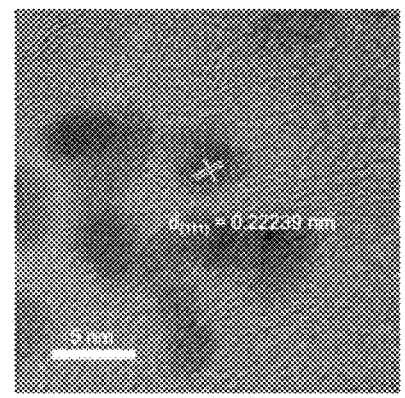

A cycling performance study was performed to measure the recovery capability of a single $PdH_{0.5}$/C electrode from CO poisoning in multiple cycles. Two methods are employed to remove the surface covered CO: exposing the electrode to air or applying a positive potential shock between each cycle. As shown in FIG. 6A, a fresh $PdH_{0.5}$/C electrode firstly conducts an electrolysis test at −0.4V in $CO_2$-saturated 0.1 M $KHCO_3$ electrolyte until the catalyst is substantially deactivated due to CO poisoning, followed by exposing the electrode to air for 5 min and reassembling to execute $CO_2$ reduction at the same potential (−0.4V) for the 2nd cycle and so on. The result shows that the endurance time for the 1st cycle is around 250 min, which is consistent with the stability test result as discussed above, whereas the retention time for the 2nd cycle (ca. 100 min) is shorter than 1st cycle with a partial recovery of initial current density, attributing to a slight aggregation of the catalyst during the 1st cycle (FIG. 9). The following cycles (3rd, 4th, and 5th cycle) act essentially identical to the 2nd cycle, which still exceeds most of the reported works, exhibiting a commendable cycling performance behavior. In addition, the surface-bound CO can be removed by applying an oxidizing current at positive potential instead of impractically exposing the electrode to air for practical application, which has been researched by applying a 0.65V (vs RHE) to trigger the desorption of poisoned CO by MacFarlane's group in 2017.81 But the choice of positive potential requires additional care since CO cannot be removed from the surface with insufficient potential; meanwhile, Pd can be oxidized rapidly with overgoing potential. As shown in FIG. 6B, a 1.1V (vs RHE) potential, which is arbitrarily selected according to CO stripping and CV results (FIG. 13B) is applied between $CO_2$ reduction sections for 5 min to clean the surface without redundant operations. The duration time of $CO_2$ electroreduction decreases as the number of cycles increases, pointing to an inferior $CO_2$ reduction activity and stability on metallic Pd and/or Pd oxides owing to the inevitable oxidation process during the positive potential shock. The hydride content after air exposure and positive potential shock cycling performance study is determined by TEM (FIG. 15). The $PdH_{0.5}/C$ after air exposure test remains a hydride content of x=~0.5, which provides stable performance, whereas an x of ~0.03 is observed for the catalyst after positive potential shock test, which shows a deteriorating stability. This distinct behavior and corresponding different hydride content demonstrate that the presence of hydride provides a more durable $CO_2$ reduction activity.

2.4. The Role of Lattice Hydrogen and its Participation Pathway Towards HCOO—

From the literature, DTF calculation has been employed to explain the mechanism of $CO_2RR$ on Pd catalysts. It's generally accepted that *COOH is favored on bare Pd.82 A higher free energy for *COOH is observed on Pd with more hydride82, and *OCHO is formed far easier than *COOH75, indicating formate formation is favored on PdH. Formate becomes the predominant product of $CO_2RR$ on the Pd surface with full hydride coverage.75 Besides, hydride and *CO exhibit interdependent and interactive behavior. Hydride weakens *CO adsorption75,77,82, hampering CO poisoning and promoting the formation of formate. Similar results have been shown in the work of Kersten et al. using microkinetic models that α-PdH is poisoned by CO, while β-PdH isn't.[111] *CO can also restrict hydride in turn, that the more *CO, the less hydride will be on the surface, resulting in more *CO adsorption[79], which could be the explanation of the accelerating decreasing of current density observed in the stability test on our $PdH_{0.5}/C$ (FIG. 5C).

To elucidate the reaction pathway towards HCOO— formation on $PdH_{0.5}/C$, the role of lattice hydrogen and surface adsorbed H* species were studied via isotopic analysis, wherein $D_2O$ (deuterium oxide) and $K_2CO_3$ were used to provide a protium ($^1H$ or hydrogen-1) free environment. The $^1H$-NMR employed here was able to quantitatively detect the produced HCOO— molecules, but was blind to the $DCOO^-$ counterparts. As shown in Table 2, after a 12-minute CA at −0.4 V in 0.1 M $K_2CO_4$ electrolyte, the commercial Pd/C catalysts produced 5.76 µmol HCOO— in $H_2O$ and non-detectable HCOO— in $D_2O$. In the $D_2O$ system, the potential external $^1H$ contamination from Nafion ionomer was calculated at $1.42 \times 10^{-6}$ µmol HCOO—, assuming a rapid proton exchange between the Nafion ionomer (0.813 µmol $^1H$) and bulk $D_2O$ (30 mL, $3.3 \times 10^6$ µmol $^2H$). The zero $HCOO^-$ formation in $D_2O$ system further confirmed the negligible $^1H$ contamination from Nafion and other cell components.

TABLE 2

Evaluation of lattice hydrogen participation by isotopic analysis with $D_2O$ and $K_2CO_3$.

| Catalyst | Loading µg$_{Pd}$ cm$^{-2}$ | Solvent | Yield$_{HCOO-}$* µmol | Yield$_{HCOO-}$** µmol | Assumed pathway** |
|---|---|---|---|---|---|
| Pd/C commercial | 50 | $H_2O$ | 5.76 | — | — |
| | | $D_2O$ | ~0 | $1.42 \times 10^{-6}$ | Nafion contamination |
| $PdH_{0.5}/C$ | 50 | $H_2O$ | 117 | — | — |
| | | $D_2O$ | | $6.74 \times 10^{-6}$ *** | $H_{Pd-H} \to H^+_{aq} \to HCOOH$ |
| | | | 0.2075 | 0.103 | $H_{Pd-H} \to HCOOH$ |
| | | | | 0.206 | $H_{Pd-H} \to HCOOD$ |
| | 100 | $D_2O$ | 0.4139 | 0.412 | $H_{Pd-H} \to HCOOD$ |
| | 200 | $D_2O$ | 0.8513 | 0.824 | $H_{Pd-H} \to HCOOD$ |

Figure 16:
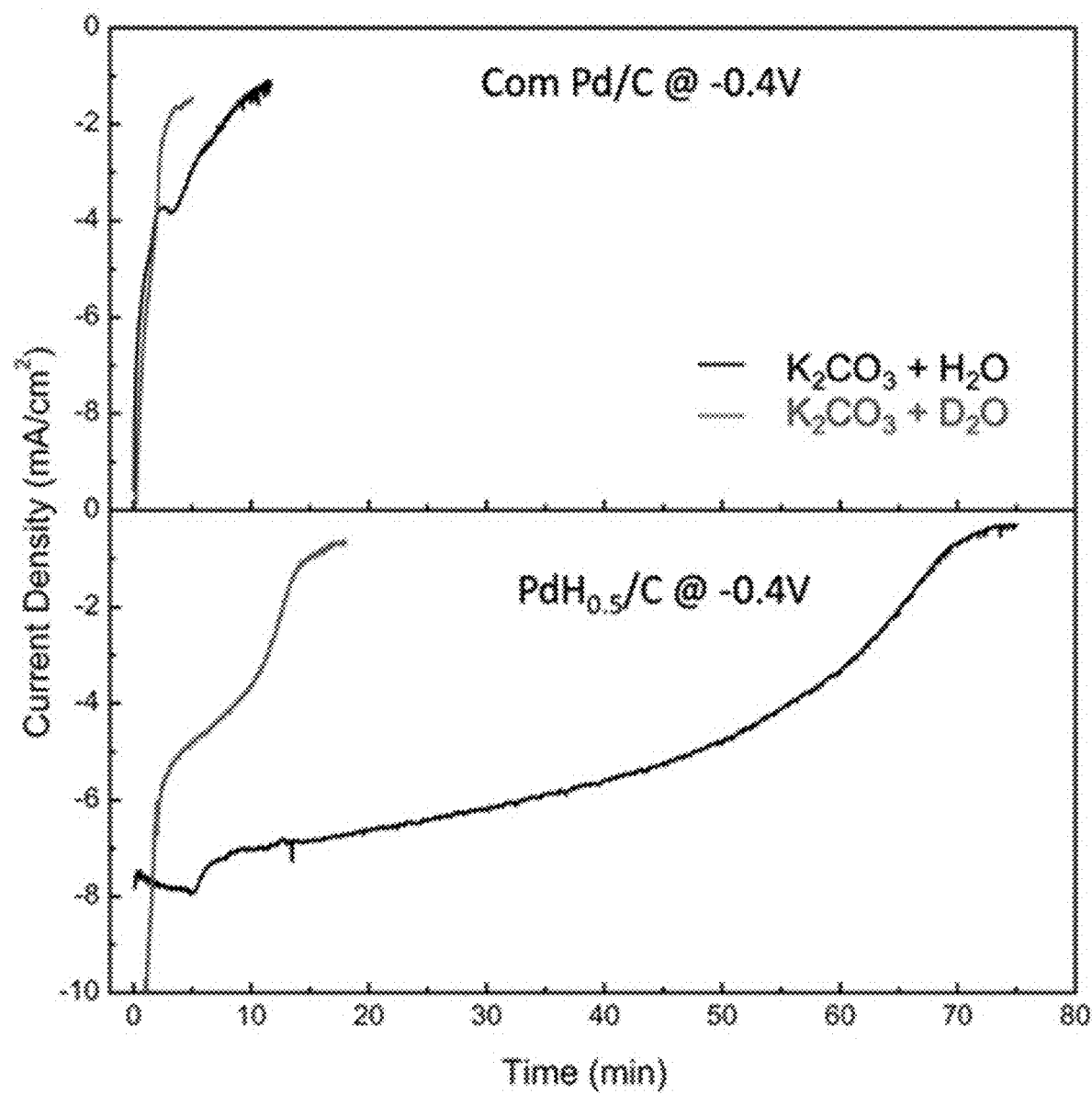
FIG. 16. CA of isotopic analysis on $PdH_{0.5}/C$ and com Pd/C. The $CO_2$ reduction is performed in $CO_2$-saturated 0.1 M $K_2CO_3$ dissolved in $D_2O$ (red) and $H_2O$ (black) at –0.4V (vs RHE).

*Actual HCOO— yield detected by $^1H$-NMR
**Theoretical yield by assumed reaction pathway of lattice hydrogen in Pd—H
HPd—H→H + aq→HCOOH, all lattice hydrogen leached out into the $D_2O$ electrolyte and then participated in the reaction for formate
HPd—H→HCOOH, lattice hydrogen directly protonate both carbon and oxygen atoms in formate
HPd—H→HCOOD, lattice hydrogen only directly protonate the carbon atom
'Nafion contamination only 'the Nafion ionomer were assumed to rapidly exchange protons with bulk $D_2O$ right after being immersed into the electrolyte.
*** Calculation considering the ratio of lattice hydrogen and $D_2O$ and the formate yield in $H_2O$ When using $PdH_{0.5}/C$ catalysts, the cathodic current carried at −0.4V v. s. RHE gradually dropped to zero in ~70 min in $K_2CO_3+H_2O$ system (FIG. 16), which was approximately 4 times lower than that in $KHCO_3+H_2O$ system (FIG. 5C and Table 1). Nonetheless, the control tests in $K_2CO_3+H_2O$ system resulted in decent amounts of HCOO— produced from both $PdH_{0.5}/C$ (FEH$_{COO-}$=~90.1%) and commercial Pd/C (FE$_{HCOO-}$=~48.8%). For $PdH_{0.5}/C$ catalysts, the quantity of HCOO— produced in $D_2O$ was determined to be ~0.2075 which was in perfect agreement with the hydrogen content in the loaded $PdH_{0.5}/C$ (50 µgPd cm$^{-2}$), based on the assumption that lattice hydrogen only protonated the carbon atom ($H_{Pd-H} \to HCOOD$) as shown in Table 2. The same agreement was achieved for trials with different loading of $PdH_{0.5}/C$ (100 µgPd cm-2 and 200 µgPd cm$^{-2}$). These results provide strong evidence for direct participation of lattice hydrogen in formate production. We experimentally demonstrated this *H pathway, which had not been proved before, although it had been proposed in several other papers:

$$*+[e^-+H^+(aq)]\rightarrow *H \quad (5)$$

$$*H+CO_2 \rightarrow *HCOO \quad (6)$$

$$*HCOO+[e^-+H^+(aq)]\rightarrow *+HCOOH \quad (7)$$

Figure 6C:
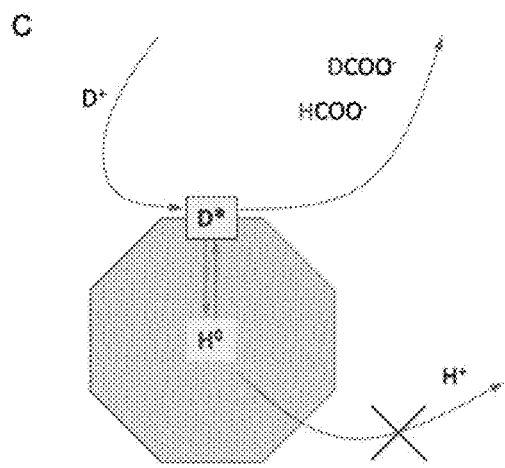

As mentioned before, the hydrogen content in $PdH_{0.5}/C$ was well maintained in the 4-hour CA (FIGS. 3 and 5C), indicating a dynamic consumption and replenishment of lattice hydrogen (H0) and surface H* species. Given the fact of direct participation of lattice hydrogen in formate formation, as supported by isotopic analysis, the following reaction mechanism was proposed as shown in FIG. 6C. Specifically, at cathodic potentials (e.g., −0.4 V vs. RHE), the proton species ($H^+$) from the electrolyte were actively reduced to surface H* species that were subject to exchange with the lattice hydrogen (H0) via a mutual diffusion mode.112-114 As a result, the lattice hydrogen had the chance to reach the Pd surface to produce $HCOO^-$ in the $D_2O$ system (FIG. 6B). In this process, the replenished surface hydride from the electrolyte was capable of diffusing into the bulk since our $PdH_{0.5}/C$ nanoparticles had readily enlarged lattice, maintaining a stable hydrogen-rich equilibrium composition for $PdH_{0.5}/C$ during electrolysis. Moreover, the high concentration of lattice hydrogen increased the chemical potential of the surface H* intermediate towards the protonation of the carbon atoms in $CO_2$ molecules.[103,110] As a result, the formation of CO (*COOH pathway) was largely suppressed and the stability of the Pd catalyst was improved in terms of both faradaic efficiency for formate and stable current density. (Table 1)

In contrast, pure Pd nanoparticles rely on the dynamic surface hydride formed at cathodic conditions.[88] Kanan and co-workers suggested the formation of β-hydride (Pd—$H_x$, x~0.7) on the commercial Pd surface, based on an early work for the electrochemical Pd hydride formation in a non-$CO_2$RR environment.[115] In fact, the nature of pure Pd nanoparticles in electrolysis remains ambiguous. In our opinion, the Pd nanoparticles in $CO_2$RR tend to form a dynamic hydride surface that is closed to α-phase.[116] The core of the Pd particles, particularly the big ones, remains as a pure Pd phase or hydrogen-poor phase. Consequently, the surface H* species have chemical potentials for HCOO— formation as well as diffusing into the bulk Pd. Therefore, the protonation of the $CO_2$ molecule or associated intermediates is not as favorable as the $PdH_{0.5}/C$ catalysts. This explains their undermined stability and FE as shown in Table 1.

Looking beyond the CO tolerance improvement by lattice hydrogen, the design of CO-immune Pd-based electrocatalysts can realize an energy-efficient HCOO— production in real. Another interesting finding in this work is the 6.5% sub-peak in CO stripping (FIG. 5B), which agreed well with the ratio of ending current and initial current (6.25%) in FIG. 5C. As mentioned before, this peak was assigned to the Pd kink sites or exposed grain boundaries. Some early work suggested that the grain boundaries were actually a hydrogen-rich local region as compared to the global hydrogen content in Pd hydride.[115] Therefore, such low coordinated sites or a higher hydrogen content domain provides inspiration for the design of CO-immune Pd-based catalysts.

2. Conclusions

In summary, we synthesized hydrogen-rich $PdH_{0.5}$ nanoparticles with an average size of 3.15 nm monodispersed onto carbon black by using an undemanding solvothermal synthesis method. The existence of hydride in the Pd lattice remarkably expands the window of $CO_2$RR and ameliorates the electrocatalytic $CO_2$ reduction activity as well as stability by modifying the surface electronic structure and participating in the electrohydrogenation of $CO_2$, exhibiting a 93.1% faradaic efficiency of formate for the 1st hour and remained above 90% faradaic efficiency of formate for 4 hours of $CO_2$ electroreduction in 0.1 M $KHCO_3$ at −0.4V, which stability is over 15 times better than commercial Pd/C. The TEM and XPS results of $PdH_{0.5}/C$ electrode before and after the stability test indicate the constant lattice parameter during $CO_2$RR, bespeaking the significant role of hydride in electrolysis. CO poisoning occupies and deactivates the active catalytic surface, where step and kink sites on the nanoparticle surface of $PdH_{0.5}/C$ are found to bind CO weaker than the terrace site, triggering the high CO tolerance and superb $CO_2$ reduction stability. The plateau current density after the stability test matches the kink or grain boundaries site ratio compared to initial current density with formate continuously produced, suggesting a potential immune site for CO poisoning on $PdH_{0.5}/C$. Cycling performance with Air exposure and positive potential shock shows the capability of restoring the $CO_2$ reduction activity by oxidizing surface adsorbed CO. The unchanged hydride content during the cycling performance with air exposure exhibits better stability performance than the reduced hydride content after cycling performance with positive potential shock, further demonstrating the hydride role of promoting $CO_2$RR activity and stability. Isotopic analysis in $D_2O$ and $K_2CO_3$ reveals the participation pathway of hydride towards HCOO—, that hydride is able to form C—H bond in formate and is replenished from solution at negative potentials.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES (1) Whipple, D. T.; Kenis, P. J. A. Prospects of $CO_2$ Utilization via Direct Heterogeneous Electrochemical Reduction. J. Phys. Chem. Lett. 2010. https://doi.org/10.1021/jz1012627.

(2) Costentin, C.; Robert, M.; Savéant, J. M. Catalysis of the Electrochemical Reduction of Carbon Dioxide. Chem. Soc. Rev. 2013. https://doi.org/10.1039/c2cs35360a.

(3) Quadrelli, E. A.; Centi, G.; Duplan, J. L.; Perathoner, S. Carbon Dioxide Recycling: Emerging Large-Scale Technologies with Industrial Potential. ChemSusChem. 2011. https://doi.org/10.1002/cssc.201100473.

(4) Appel, A. M.; Bercaw, J. E.; Bocarsly, A. B.; Dobbek, H.; Dubois, D. L.; Dupuis, M.; Ferry, J. G.; Fujita, E.; Hille, R.; Kenis, P. J. A.; Kerfeld, C. A.; Morris, R. H.; Peden, C. H. F.; Portis, A. R.; Ragsdale, S. W.; Rauchfuss, T. B.; Reek, J. N. H.; Seefeldt, L. C.; Thauer, R. K.; Waldrop, G. L. Frontiers, Opportunities, and Challenges in Biochemical and Chemical Catalysis of $CO_2$ Fixation. Chemical Reviews. 2013. https://doi.org/10.1021/cr300463y.

(5) Aresta, M.; Dibenedetto, A.; Angelini, A. Catalysis for the Valorization of Exhaust Carbon: From $CO_2$ to Chemicals, Materials, and Fuels. Technological Use of $CO_2$. Chemical Reviews. 2014. https://doi.org/10.1021/cr4002758.

(6) Kuhl, K. P.; Hatsukade, T.; Cave, E. R.; Abram, D. N.; Kibsgaard, J.; Jaramillo, T. F. Electrocatalytic Conversion of Carbon Dioxide to Methane and Methanol on Transition Metal Surfaces. J. Am. Chem. Soc. 2014. https://doi.org/10.1021/ja505791r.

(7) Schouten, K. J. P.; Kwon, Y.; Van Der Ham, C. J. M.; Qin, Z.; Koper, M. T. M. A New Mechanism for the Selectivity to C1 and C2 Species in the Electrochemical Reduction of Carbon Dioxide on Copper Electrodes. Chem. Sci. 2011. https://doi.org/10.1039/c1sc00277e.

(8) Peterson, A. A.; Abild-Pedersen, F.; Studt, F.; Rossmeisl, J.; Nørskov, J. K. How Copper Catalyzes the Electroreduction of Carbon Dioxide into Hydrocarbon Fuels. Energy Environ. Sci. 2010. https://doi.org/10.1039/c0ee00071j.

(9) Kuhl, K. P.; Cave, E. R.; Abram, D. N.; Jaramillo, T. F. New Insights into the Electrochemical Reduction of Carbon Dioxide on Metallic Copper Surfaces. Energy Environ. Sci. 2012. https://doi.org/10.1039/c2ee21234j.

(10) Gattrell, M.; Gupta, N.; Co, A. A Review of the Aqueous Electrochemical Reduction of $CO_2$ to Hydrocarbons at Copper. Journal of Electroanalytical Chemistry. 2006. https://doi.org/10.1016/j.jelechem.2006.05.013.

(11) Nie, X.; Esopi, M. R.; Janik, M. J.; Asthagiri, A. Selectivity of $CO_2$ Reduction on Copper Electrodes: The Role of the Kinetics of Elementary Steps. Angew. Chemie—Int. Ed. 2013. https://doi.org/10.1002/anie.201208320.

(12) Hori, Y. Electrochemical $CO_2$ Reduction on Metal Electrodes. In Modern Aspects of Electrochemistry; 2008. https://doi.org/10.1007/978-0-387-49489-0_3.

(13) Wang, X.; Varela, A. S.; Bergmann, A.; Kühl, S.; Strasser, P. Catalyst Particle Density Controls Hydrocarbon Product Selectivity in $CO_2$ Electroreduction on CuOx. ChemSusChem 2017. https://doi.org/10.1002/cssc.201701179.

(14) Zhang, W.; Hu, Y.; Ma, L.; Zhu, G.; Wang, Y.; Xue, X.; Chen, R.; Yang, S.; Jin, Z. Progress and Perspective of Electrocatalytic $CO_2$ Reduction for Renewable Carbonaceous Fuels and Chemicals. Advanced Science. 2018. https://doi.org/10.1002/advs.201700275.

(15) Kortlever, R.; Shen, J.; Schouten, K. J. P.; Calle-Vallejo, F.; Koper, M. T. M. Catalysts and Reaction Pathways for the Electrochemical Reduction of Carbon Dioxide. J. Phys. Chem. Lett. 2015. https://doi.org/10.1021/acs.jpclett.5b01559.

(16) Goyal, A.; Marcandalli, G.; Mints, V. A.; Koper, M. T. M. Competition between $CO_2$ Reduction and Hydrogen Evolution on a Gold Electrode under Well-Defined Mass Transport Conditions. J. Am. Chem. Soc. 2020. https://doi.org/10.1021/jacs.9b10061.

(17) Higgins, D.; Hahn, C.; Xiang, C.; Jaramillo, T. F.; Weber, A. Z. Gas-Diffusion Electrodes for Carbon Dioxide Reduction: A New Paradigm. ACS Energy Lett. 2019. https://doi.org/10.1021/acsenergylett.8b02035.

(18) Asset, T.; Garcia, S. T.; Herrera, S.; Andersen, N.; Chen, Y.; Peterson, E. J.; Matanovic, I.; Artyushkova, K.; Lee, J.; Minteer, S. D.; Dai, S.; Pan, X.; Chavan, K.; Calabrese Barton, S.; Atanassov, P. Investigating the Nature of the Active Sites for the $CO_2$ Reduction Reaction on Carbon-Based Electrocatalysts. ACS Catal. 2019. https://doi.org/10.1021/acscatal.9b01513.

(19) Guo, S.; Asset, T.; Atanassov, P. Catalytic Hybrid Electrocatalytic/Biocatalytic Cascades for Carbon Dioxide Reduction and Valorization. ACS Catal. 2021, 5172-5188. https://doi.org/10.1021/acscatal.0c04862.

(20) Bagger, A.; Ju, W.; Varela, A. S.; Strasser, P.; Rossmeisl, J. Electrochemical $CO_2$ Reduction: A Classification Problem. ChemPhysChem 2017, 18 (22), 3266-3273. https://doi.org/10.1002/cphc.201700736.

(21) Azuma, M.; Hashimoto, K.; Hiramoto, M.; Watanabe, M.; Sakata, T. Electrochemical Reduction of Carbon Dioxide on Various Metal Electrodes in Low-Temperature Aqueous $KHCO_3$ Media. J. Electrochem. Soc. 1990. https://doi.org/10.1149/1.2086796.

(22) Hori, Y.; Wakebe, H.; Tsukamoto, T.; Koga, O. Electrocatalytic Process of CO Selectivity in Electrochemical Reduction of $CO_2$ at Metal Electrodes in Aqueous Media. Electrochim. Acta 1994. https://doi.org/10.1016/0013-4686(94)85172-7.

(23) Rosen, J.; Hutchings, G. S.; Lu, Q.; Rivera, S.; Zhou, Y.; Vlachos, D. G.; Jiao, F. Mechanistic Insights into the Electrochemical Reduction of $CO_2$ to CO on Nanostructured Ag Surfaces. ACS Catal. 2015. https://doi.org/10.1021/acscatal.5b00840.

(24) Back, S.; Yeom, M. S.; Jung, Y. Active Sites of Au and Ag Nanoparticle Catalysts for $CO_2$ Electroreduction to CO. ACS Catal. 2015. https://doi.org/10.1021/acscatal.5b00462.

(25) Zhu, W.; Michalsky, R.; Metin, Ö.; Lv, H.; Guo, S.; Wright, C. J.; Sun, X.; Peterson, A. A.; Sun, S. Monodisperse Au Nanoparticles for Selective Electrocatalytic Reduction of $CO_2$ to CO. J. Am. Chem. Soc. 2013. https://doi.org/10.1021/ja409445p.

(26) Luo, W.; Zhang, J.; Li, M.; Züttel, A. Boosting CO Production in Electrocatalytic $CO_2$ Reduction on Highly Porous Zn Catalysts. ACS Catal. 2019. https://doi.org/10.1021/acscatal.8b05109.

(27) Varela, A. S.; Ju, W.; Bagger, A.; Franco, P.; Rossmeisl, J.; Strasser, P. Electrochemical Reduction of $CO_2$ on Metal-Nitrogen-Doped Carbon Catalysts. ACS Catalysis. 2019. https://doi.org/10.1021/acscatal.9b01405.

(28) Delafontaine, L.; Asset, T.; Atanassov, P. Metal-Nitrogen-Carbon Electrocatalysts for $CO_2$ Reduction towards Syngas Generation. ChemSusChem. 2020. https://doi.org/10.1002/cssc.201903281.

(29) Ju, W.; Bagger, A.; Hao, G. P.; Varela, A. S.; Sinev, I.; Bon, V.; Roldan Cuenya, B.; Kaskel, S.; Rossmeisl, J.; Strasser, P. Understanding Activity and Selectivity of Metal-Nitrogen-Doped Carbon Catalysts for Electrochemical Reduction of $CO_2$. Nat. Commun. 2017. https://doi.org/10.1038/s41467-017-01035-z.

(30) Varela, A. S.; Ju, W.; Strasser, P. Molecular Nitrogen-Carbon Catalysts, Solid Metal Organic Framework Catalysts, and Solid Metal/Nitrogen-Doped Carbon (MNC) Catalysts for the Electrochemical $CO_2$ Reduction. Advanced Energy Materials. 2018. https://doi.org/10.1002/aenm.201703614.

(31) Sen, S.; Liu, D.; Palmore, G. T. R. Electrochemical Reduction of $CO_2$ at Copper Nanofoams. ACS Catal. 2014. https://doi.org/10.1021/cs500522g.

(32) Varela, A. S.; Ju, W.; Reier, T.; Strasser, P. Tuning the Catalytic Activity and Selectivity of Cu for $CO_2$ Electroreduction in the Presence of Halides. ACS Catal. 2016. https://doi.org/10.1021/acscatal.5b02550.

(33) Hori, Y.; Takahashi, I.; Koga, O.; Hoshi, N. Selective Formation of C2 Compounds from Electrochemical Reduction of $CO_2$ at a Series of Copper Single Crystal Electrodes. J. Phys. Chem. B 2002. https://doi.org/10.1021/jp013478d.

(34) Ahn, S. T.; Abu-Baker, I.; Palmore, G. T. R. Electroreduction of CO$_2$ on Polycrystalline Copper: Effect of Temperature on Product Selectivity. Catal. Today 2017. https://doi.org/10.1016/j.cattod.2016.09.028.

(35) Tang, W.; Peterson, A. A.; Varela, A. S.; Jovanov, Z. P.; Bech, L.; Durand, W. J.; Dahl, S.; Nørskov, J. K.; Chorkendorff, I. The Importance of Surface Morphology in Controlling the Selectivity of Polycrystalline Copper for CO$_2$ Electroreduction. Phys. Chem. Chem. Phys. 2012. https://doi.org/10.1039/c1cp22700a.

(36) Dutta, A.; Rahaman, M.; Luedi, N. C.; Mohos, M.; Broekmann, P. Morphology Matters: Tuning the Product Distribution of CO$_2$ Electroreduction on Oxide-Derived Cu Foam Catalysts. ACS Catal. 2016. https://doi.org/10.1021/acscatal.6b00770.

(37) Hoang, T. T. H.; Ma, S.; Gold, J. I.; Kenis, P. J. A.; Gewirth, A. A. Nanoporous Copper Films by Additive-Controlled Electrodeposition: CO$_2$ Reduction Catalysis. ACS Catal. 2017. https://doi.org/10.1021/acscatal.6b03613.

(38) Reske, R.; Mistry, H.; Behafarid, F.; Roldan Cuenya, B.; Strasser, P. Particle Size Effects in the Catalytic Electroreduction of CO$_2$ on Cu Nanoparticles. J. Am. Chem. Soc. 2014. https://doi.org/10.1021/ja500328k.

(39) Wang, Y.; Shen, H.; Livi, K. J. T.; Raciti, D.; Zong, H.; Gregg, J.; Onadeko, M.; Wan, Y.; Watson, A.; Wang, C. Copper Nanocubes for CO$_2$ Reduction in Gas Diffusion Electrodes. Nano Lett. 2019. https://doi.org/10.1021/acs.nanolett.9b02748.

(40) Lu, X.; Leung, D. Y. C.; Wang, H.; Leung, M. K. H.; Xuan, J. Electrochemical Reduction of Carbon Dioxide to Formic Acid. ChemElectroChem 2014. https://doi.org/10.1002/celc.201300206.

(41) Zhang, H.; Ma, Y.; Quan, F.; Huang, J.; Jia, F.; Zhang, L. Selective Electro-Reduction of CO$_2$ to Formate on Nanostructured Bi from Reduction of BiOCl Nanosheets. Electrochem. commun. 2014. https://doi.org/10.1016/j.elecom.2014.06.013.

(42) Zhang, S.; Kang, P.; Meyer, T. J. Nanostructured Tin Catalysts for Selective Electrochemical Reduction of Carbon Dioxide to Formate. J. Am. Chem. Soc. 2014. https://doi.org/10.1021/ja4113885.

(43) Detweiler, Z. M.; White, J. L.; Bernasek, S. L.; Bocarsly, A. B. Anodized Indium Metal Electrodes for Enhanced Carbon Dioxide Reduction in Aqueous Electrolyte. Langmuir 2014. https://doi.org/10.1021/la501245p.

(44) Yang, Z.; Oropeza, F. E.; Zhang, K. H. L. P-Block Metal-Based (Sn, In, Bi, Pb) Electrocatalysts for Selective Reduction of CO$_2$ to Formate. APL Mater. 2020. https://doi.org/10.1063/5.0004194.

(45) Pander, J. E.; Lum, J. W. J.; Yeo, B. S. The Importance of Morphology on the Activity of Lead Cathodes for the Reduction of Carbon Dioxide to Formate. J. Mater. Chem. A 2019. https://doi.org/10.1039/c8ta10752a.

(46) Jouny, M.; Luc, W.; Jiao, F. General Techno-Economic Analysis of CO$_2$ Electrolysis Systems. Ind. Eng. Chem. Res. 2018. https://doi.org/10.1021/acs.iecr.7b03514.

(47) Vo, T.; Purohit, K.; Nguyen, C.; Biggs, B.; Mayoral, S.; Haan, J. L. Formate: An Energy Storage and Transport Bridge between Carbon Dioxide and a Formate Fuel Cell in a Single Device. ChemSusChem 2015. https://doi.org/10.1002/cssc.201500958.

(48) Yu, X.; Pickup, P. G. Recent Advances in Direct Formic Acid Fuel Cells (DFAFC). Journal of Power Sources. 2008. https://doi.org/10.1016/j.jpowsour.2008.03.075.

(49) El-Nagar, G. A.; Hassan, M. A.; Lauermann, I.; Roth, C. Efficient Direct Formic Acid Fuel Cells (DFAFCs) Anode Derived from Seafood Waste: Migration Mechanism. Sci. Rep. 2017. https://doi.org/10.1038/s41598-017-17978-8.

(50) Yan, B.; Concannon, N. M.; Milshtein, J. D.; Brushett, F. R.; Surendranath, Y. A Membrane-Free Neutral PH Formate Fuel Cell Enabled by a Selective Nickel Sulfide Oxygen Reduction Catalyst. Angew. Chemie—Int. Ed. 2017. https://doi.org/10.1002/anie.201702578.

(51) Qi, X.; Li, H. P.; Wu, X. F. A Convenient Palladium-Catalyzed Carbonylative Synthesis of Benzofuran-2(3H)-Ones with Formic Acid as the CO Source. Chem.—An Asian J. 2016. https://doi.org/10.1002/asia.201600873.

(52) Long, B.; Long, Z. W.; Wang, Y. B.; Tan, X. F.; Han, Y. H.; Long, C. Y.; Qin, S. J.; Zhang, W. J. Formic Acid Catalyzed Gas-Phase Reaction of H$_2$O with SO$_3$ and the Reverse Reaction: A Theoretical Study. ChemPhysChem 2012. https://doi.org/10.1002/cphc.201100558.

(53) Koh, J. H.; Won, D. H.; Eom, T.; Kim, N. K.; Jung, K. D.; Kim, H.; Hwang, Y. J.; Min, B. K. Facile CO$_2$ Electro-Reduction to Formate via Oxygen Bidentate Intermediate Stabilized by High-Index Planes of Bi Dendrite Catalyst. ACS Catal. 2017. https://doi.org/10.1021/acscatal.7b00707.

(54) Birdja, Y. Y.; Pérez-Gallent, E.; Figueiredo, M. C.; Göttle, A. J.; Calle-Vallejo, F.; Koper, M. T. M. Advances and Challenges in Understanding the Electrocatalytic Conversion of Carbon Dioxide to Fuels. Nature Energy. 2019. https://doi.org/10.1038/s41560-019-0450-y.

(55) Min, X.; Kanan, M. W. Pd-Catalyzed Electrohydrogenation of Carbon Dioxide to Formate: High Mass Activity at Low Overpotential and Identification of the Deactivation Pathway. J. Am. Chem. Soc. 2015. https://doi.org/10.1021/ja511890h.

(56) Zhao, S.; Li, S.; Guo, T.; Zhang, S.; Wang, J.; Wu, Y.; Chen, Y. Advances in Sn-Based Catalysts for Electrochemical CO$_2$ Reduction. Nano-Micro Letters. 2019. https://doi.org/10.1007/s40820-019-0293-x.

(57) Feaster, J. T.; Shi, C.; Cave, E. R.; Hatsukade, T.; Abram, D. N.; Kuhl, K. P.; Hahn, C.; Nørskov, J. K.; Jaramillo, T. F. Understanding Selectivity for the Electrochemical Reduction of Carbon Dioxide to Formic Acid and Carbon Monoxide on Metal Electrodes. ACS Catal. 2017. https://doi.org/10.1021/acscatal.7b00687.

(58) Tang, Q.; Lee, Y.; Li, D. Y.; Choi, W.; Liu, C. W.; Lee, D.; Jiang, D. E. Lattice-Hydride Mechanism in Electrocatalytic CO$_2$ Reduction by Structurally Precise Copper-Hydride Nanoclusters. J. Am. Chem. Soc. 2017. https://doi.org/10.1021/jacs.7b05591.

(59) Han, N.; Wang, Y.; Deng, J.; Zhou, J.; Wu, Y.; Yang, H.; Ding, P.; Li, Y. Self-Templated Synthesis of Hierarchical Mesoporous SnO2 Nanosheets for Selective CO$_2$ Reduction. J. Mater. Chem. A 2019, 7 (3), 1267-1272. https://doi.org/10.1039/C8TA10959A.

(60) Kumar, B.; Atla, V.; Brian, J. P.; Kumari, S.; Nguyen, T. Q.; Sunkara, M.; Spurgeon, J. M. Reduced SnO2 Porous Nanowires with a High Density of Grain Boundaries as Catalysts for Efficient Electrochemical CO$_2$-into-HCOOH Conversion. Angew. Chemie—Int. Ed. 2017. https://doi.org/10.1002/anie.201612194.

(61) Yang, F.; Elnabawy, A. O.; Schimmenti, R.; Song, P.; Wang, J.; Peng, Z.; Yao, S.; Deng, R.; Song, S.; Lin, Y.; Mavrikakis, M.; Xu, W. Bismuthene for Highly Efficient Carbon Dioxide Electroreduction Reaction. Nat. Commun. 2020. https://doi.org/10.1038/s41467-020-14914-9.

(62) Zhang, X.; Guo, S. X.; Gandionco, K. A.; Bond, A. M.; Zhang, J. Electrocatalytic Carbon Dioxide Reduction: From Fundamental Principles to Catalyst Design. Materials Today Advances. 2020. https://doi.org/10.1016/j.mtadv.2020.100074.

(63) Zhang, X.; Hou, X.; Zhang, Q.; Cai, Y.; Liu, Y.; Qiao, J. Polyethylene Glycol Induced Reconstructing Bi Nanoparticle Size for Stabilized $CO_2$ Electroreduction to Formate. J. Catal. 2018. https://doi.org/10.1016/j.jcat.2018.06.019.

(64) Yang, H.; Han, N.; Deng, J.; Wu, J.; Wang, Y.; Hu, Y.; Ding, P.; Li, Y.; Li, Y.; Lu, J. Selective $CO_2$ Reduction on 2D Mesoporous Bi Nanosheets. Adv. Energy Mater. 2018. https://doi.org/10.1002/aenm.201801536.

(65) Han, N.; Wang, Y.; Yang, H.; Deng, J.; Wu, J.; Li, Y.; Li, Y. Ultrathin Bismuth Nanosheets from in Situ Topotactic Transformation for Selective Electrocatalytic $CO_2$ Reduction to Formate. Nat. Commun. 2018. https://doi.org/10.1038/s41467-018-03712-z.

(66) Lee, C. W.; Hong, J. S.; Yang, K. D.; Jin, K.; Lee, J. H.; Ahn, H. Y.; Seo, H.; Sung, N. E.; Nam, K. T. Selective Electrochemical Production of Formate from Carbon Dioxide with Bismuth-Based Catalysts in an Aqueous Electrolyte. ACS Catal. 2018. https://doi.org/10.1021/acscatal.7b03242.

(67) Ma, W.; Xie, S.; Zhang, X.-G.; Sun, F.; Kang, J.; Jiang, Z.; Zhang, Q.; Wu, D.-Y.; Wang, Y. Promoting Electrocatalytic $CO_2$ Reduction to Formate via Sulfur-Boosting Water Activation on Indium Surfaces. Nat. Commun. 2019, 10 (1), 892. https://doi.org/10.1038/s41467-019-08805-x.

(68) Gao, S.; Lin, Y.; Jiao, X.; Sun, Y.; Luo, Q.; Zhang, W.; Li, D.; Yang, J.; Xie, Y. Partially Oxidized Atomic Cobalt Layers for Carbon Dioxide Electroreduction to Liquid Fuel. Nature 2016. https://doi.org/10.1038/nature16455.

(69) Li, F.; Xue, M.; Li, J.; Ma, X.; Chen, L.; Zhang, X.; MacFarlane, D. R.; Zhang, J. Unlocking the Electrocatalytic Activity of Antimony for $CO_2$ Reduction by Two-Dimensional Engineering of the Bulk Material. Angew. Chemie—Int. Ed. 2017. https://doi.org/10.1002/anie.201710038.

(70) Chaplin, R. P. S.; Wragg, A. A. Effects of Process Conditions and Electrode Material on Reaction Pathways for Carbon Dioxide Electroreduction with Particular Reference to Formate Formation. Journal of Applied Electrochemistry. 2003. https://doi.org/10.1023/B:JACH.0000004018.57792.b8.

(71) He, S.; Ni, F.; Ji, Y.; Wang, L.; Wen, Y.; Bai, H.; Liu, G.; Zhang, Y.; Li, Y.; Zhang, B.; Peng, H. The P-Orbital Delocalization of Main-Group Metals to Boost $CO_2$ Electroreduction. Angew. Chemie—Int. Ed. 2018. https://doi.org/10.1002/anie.201810538.

(72) Noda, H.; Ikeda, S.; Oda, Y.; Imai, K.; Maeda, M.; Ito, K. Electrochemical Reduction of Carbon Dioxide at Various Metal Electrodes in Aqueous Potassium Hydrogen Carbonate Solution. Bull. Chem. Soc. Jpn. 1990. https://doi.org/10.1246/bcsj.63.2459.

(73) Kortlever, R.; Peters, I.; Koper, S.; Koper, M. T. M. Electrochemical $CO_2$ Reduction to Formic Acid at Low Overpotential and with High Faradaic Efficiency on Carbon-Supported Bimetallic Pd—Pt Nanoparticles. ACS Catal. 2015. https://doi.org/10.1021/acscatal.5b00602.

(74) Stalder, C. J.; Chao, S.; Wrighton, M. S. Electrochemical Reduction of Aqueous Bicarbonate to Formate with High Current Efficiency Near the Thermodynamic Potential at Chemically Derivatized Electrodes. J. Am. Chem. Soc. 1984. https://doi.org/10.1021/ja00324a046.

(75) Gao, D.; Zhou, H.; Cai, F.; Wang, D.; Hu, Y.; Jiang, B.; Cai, W. Bin; Chen, X.; Si, R.; Yang, F.; Miao, S.; Wang, J.; Wang, G.; Bao, X. Switchable $CO_2$ Electroreduction via Engineering Active Phases of Pd Nanoparticles. Nano Res. 2017. https://doi.org/10.1007/s12274-017-15514-6.

(76) Rahaman, M.; Dutta, A.; Broekmann, P. Size-Dependent Activity of Palladium Nanoparticles: Efficient Conversion of $CO_2$ into Formate at Low Overpotentials. ChemSusChem 2017. https://doi.org/10.1002/cssc.201601778.

(77) Jiang, T. W.; Zhou, Y. W.; Ma, X. Y.; Qin, X.; Li, H.; Ding, C.; Jiang, B.; Jiang, K.; Cai, W. Bin. Spectrometric Study of Electrochemical $CO_2$Reduction on Pd and Pd—B Electrodes. ACS Catal. 2021. https://doi.org/10.1021/acscatal.0c03725.

(78) Abild-Pedersen, F.; Andersson, M. P. CO Adsorption Energies on Metals with Correction for High Coordination Adsorption Sites—A Density Functional Study. Surf. Sci. 2007. https://doi.org/10.1016/j.susc.2007.01.052.

(79) Chatterjee, S.; Griego, C.; Hart, J. L.; Li, Y.; Taheri, M. L.; Keith, J.; Snyder, J. D. Free Standing Nanoporous Palladium Alloys as CO Poisoning Tolerant Electrocatalysts for the Electrochemical Reduction of $CO_2$ to Formate. ACS Catal. 2019. https://doi.org/10.1021/acscatal.9b00330.

(80) Klinkova, A.; De Luna, P.; Dinh, C. T.; Voznyy, O.; Larin, E. M.; Kumacheva, E.; Sargent, E. H. Rational Design of Efficient Palladium Catalysts for Electroreduction of Carbon Dioxide to Formate. ACS Catal. 2016. https://doi.org/10.1021/acscatal.6b01719.

(81) Zhou, F.; Li, H.; Fournier, M.; MacFarlane, D. R. Electrocatalytic $CO_2$ Reduction to Formate at Low Overpotentials on Electrodeposited Pd Films: Stabilized Performance by Suppression of CO Formation. ChemSusChem 2017. https://doi.org/10.1002/cssc.201601870.

(82) Jiang, B.; Zhang, X. G.; Jiang, K.; Wu, D. Y.; Cai, W. Bin. Boosting Formate Production in Electrocatalytic $CO_2$ Reduction over Wide Potential Window on Pd Surfaces. J. Am. Chem. Soc. 2018. https://doi.org/10.1021/jacs.7b12506.

(83) Takashima, T.; Suzuki, T.; Irie, H. Electrochemical Reduction of Carbon Dioxide to Formate on Palladium-Copper Alloy Nanoparticulate Electrode. Electrochemistry 2019. https://doi.org/10.5796/electrochemistry.18-00086.

(84) Bai, X.; Chen, W.; Zhao, C.; Li, S.; Song, Y.; Ge, R.; Wei, W.; Sun, Y. Exclusive Formation of Formic Acid from $CO_2$ Electroreduction by a Tunable Pd—Sn Alloy. Angew. Chemie—Int. Ed. 2017. https://doi.org/10.1002/anie.201707098.

(85) Li, J.; Fan, R.; Hu, H.; Yao, C. Hydrogen Sensing Performance of Silica Microfiber Elaborated with Pd Nanoparticles. Mater. Lett. 2018, 212, 211-213. https://doi.org/https://doi.org/10.1016/j.matlet.2017.10.095.

(86) Dekura, S.; Kobayashi, H.; Kusada, K.; Kitagawa, H. Hydrogen in Palladium and Storage Properties of Related Nanomaterials: Size, Shape, Alloying, and Metal-Organic Framework Coating Effects. ChemPhysChem 2019, 20 (10), 1158-1176. https://doi.org/https://doi.org/10.1002/cphc.201900109.

(87) Manchester, F. D.; San-Martin, A.; Pitre, J. M. The H—Pd (Hydrogen-Palladium) System. J. Phase Equilibria 1994. https://doi.org/10.1007/BF02667685.

(88) Lee, J. H.; Kattel, S.; Jiang, Z.; Xie, Z.; Yao, S.; Tackett, B. M.; Xu, W.; Marinkovic, N. S.; Chen, J. G. Tuning the Activity and Selectivity of Electroreduction of $CO_2$ to Synthesis Gas Using Bimetallic Catalysts. Nat. Commun. 2019. https://doi.org/10.1038/s41467-019-11352-0.

(89) Xu, W.; Fan, G.; Chen, J.; Li, J.; Zhang, L.; Zhu, S.; Su, X.; Cheng, F.; Chen, J. Nanoporous Palladium Hydride for Electrocatalytic N2 Reduction under Ambient Conditions. Angew. Chemie—Int. Ed. 2020. https://doi.org/10.1002/anie.201914335.

(90) Gao, D.; Zhou, H.; Cai, F.; Wang, J.; Wang, G.; Bao, X. Pd-Containing Nanostructures for Electrochemical $CO_2$ Reduction Reaction. ACS Catalysis. 2018. https://doi.org/10.1021/acscatal.7b03612.

(91) Qiu, Y.; Xin, L.; Li, Y.; McCrum, I. T.; Guo, F.; Ma, T.; Ren, Y.; Liu, Q.; Zhou, L.; Gu, S.; Janik, M. J.; Li, W. BCC-Phased PdCu Alloy as a Highly Active Electrocatalyst for Hydrogen Oxidation in Alkaline Electrolytes. J. Am. Chem. Soc. 2018, 140 (48), 16580-16588. https://doi.org/10.1021/jacs.8b08356.

(92) Qiu, Y.; Xin, L.; Li, Y.; McCrum, I. T.; Guo, F.; Ma, T.; Ren, Y.; Liu, Q.; Zhou, L.; Gu, S.; Janik, M. J.; Li, W. BCC-Phased PdCu Alloy as a Highly Active Electrocatalyst for Hydrogen Oxidation in Alkaline Electrolytes. J. Am. Chem. Soc. 2018. https://doi.org/10.1021/jacs.8b08356.

(93) Yano, H.; Kataoka, M.; Yamashita, H.; Uchida, H.; Watanabe, M. Oxygen Reduction Activity of Carbon-Supported Pt—M (M=V, Ni, Cr, Co, and Fe) Alloys Prepared by Nanocapsule Method. Langmuir 2007. https://doi.org/10.1021/la070078u.

(94) Wang, S.; Tian, D.; Wang, X.; Qin, J.; Tang, Y.; Zhu, J.; Cong, Y.; Liu, H.; Lv, Y.; Qiu, C.; Gao, Z.; Song, Y. Uniform PdH0.33 Nanodendrites with a High Oxygen Reduction Activity Tuned by Lattice H. Electrochem. commun. 2019, 102, 67-71. https://doi.org/https://doi.org/10.1016/j.elecom.2019.04.002.

(95) Khanuja, M.; Mehta, B. R.; Agar, P.; Kulriya, P. K.; Avasthi, D. K. Hydrogen Induced Lattice Expansion and Crystallinity Degradation in Palladium Nanoparticles: Effect of Hydrogen Concentration, Pressure, and Temperature. J. Appl. Phys. 2009. https://doi.org/10.1063/1.3253733.

(96) Schirber, J. E.; Morosin, B. Lattice Constants of B-P d H x and B-P d D x with x near 1.0. Phys. Rev. B 1975, 12 (1), 117.

(97) Worsham, J. E.; Wilkinson, M. K.; Shull, C. G. Neutron-Diffraction Observations on the Palladium-Hydrogen and Palladium-Deuterium Systems. J. Phys. Chem. Solids 1957, 3 (3), 303-310. https://doi.org/https://doi.org/10.1016/0022-3697(57)90033-1.

(98) Eastman, J. A.; Thompson, L. J.; Kestel, B. J. Narrowing of the Palladium-Hydrogen Miscibility Gap in Nanocrystalline Palladium. Phys. Rev. B 1993. https://doi.org/10.1103/PhysRevB.48.84.

(99) Wolf, R. J.; Lee, M. W.; Ray, J. R. Pressure-Composition Isotherms for Nanocrystalline Palladium Hydride. Phys. Rev. Lett. 1994, 73 (4), 557-560. https://doi.org/10.1103/PhysRevLett.73.557.

(100) Lamber, R.; Wetjen, S.; Jaeger, N. I. Size Dependence of the Lattice Parameter of Small Palladium Particles. Phys. Rev. B 1995. https://doi.org/10.1103/PhysRevB.51.10968.

(101) Huang, Z.; Thomson, P.; Di, S. Lattice Contractions of a Nanoparticle Due to the Surface Tension: A Model of Elasticity. J. Phys. Chem. Solids 2007. https://doi.org/10.1016/j.jpcs.2007.01.016.

(102) Bragg, W. H.; Bragg, W. L. The Reflection of X-Rays by Crystals. Proc. R. Soc. London. Ser. A, Contain. Pap. a Math. Phys. Character 1913. https://doi.org/10.1098/rspa.1913.0040.

(103) Ohkawa, K.; Hashimoto, K.; Fujishima, A.; Noguchi, Y.; Nakayama, S. Electrochemical Reduction of Carbon Dioxide on Hydrogenstoring Materials: Part 1. The Effect of Hydrogen Absorption on the Electrochemical Behavior on Palladium Electrodes. J. Electroanal. Chem. 1993, 345 (1), 445-456. https://doi.org/https://doi.org/10.1016/0022-0728(93)80495-4.

(104) Stuve, E. M.; Madix, R. J.; Brundle, C. R. CO Oxidation on Pd(100): A Study of the Coadsorption of Oxygen and Carbon Monoxide. Surf. Sci. 1984. https://doi.org/10.1016/0039-6028(84)90235-8.

(105) Peter, M.; Adamovsky, S.; Flores Camacho, J. M.; Schauermann, S. Energetics of Elementary Reaction Steps Relevant for CO Oxidation: CO and O2 Adsorption on Model Pd Nanoparticles and Pd(111). Faraday Discussions. 2013. https://doi.org/10.1039/c3fd00001j.

(106) Peter, M.; Florescamacho, J. M.; Adamovski, S.; Ono, L. K.; Dostert, K. H.; O'Brien, C. P.; Roldancuenya, B.; Schauermann, S.; Freund, H. J. Trends in the Binding Strength of Surface Species on Nanoparticles: How Does the Adsorption Energy Scale with the Particle Size? Angew. Chemie—Int. Ed. 2013. https://doi.org/10.1002/anie.201209476.

(107) Guo, R.-H.; Hu, C.-C. The Relationships among Hydrogen Adsorption, CO Stripping, and Selectivity of CO 2 Reduction on Pd Nanoparticles. J. Electrochem. Soc. 2021. https://doi.org/10.1149/1945-7111/abf17e.

(108) García, G.; Koper, M. T. M. Stripping Voltammetry of Carbon Monoxide Oxidation on Stepped Platinum Single-Crystal Electrodes in Alkaline Solution. Phys. Chem. Chem. Phys. 2008. https://doi.org/10.1039/b803503m.

(109) Guo, R. H.; Liu, C. F.; Wei, T. C.; Hu, C. C. Electrochemical Behavior of $CO_2$ Reduction on Palladium Nanoparticles: Dependence of Adsorbed CO on Electrode Potential. Electrochem. commun. 2017. https://doi.org/10.1016/j.elecom.2017.05.005.

(110) Guo, R.; Hu, C. The Relationships among Hydrogen Adsorption, CO Stripping, and Selectivity of CO 2 Reduction on Pd Nanoparticles. J. Electrochem. Soc. 2021. https://doi.org/10.1149/1945-7111/abf17e.

(111) Blom, M. J. W.; van Swaaij, W. P. M.; Mul, G.; Kersten, S. R. A. Mechanism and Micro Kinetic Model for Electroreduction of $CO_2$ on Pd/C: The Role of Different Palladium Hydride Phases. ACS Catal. 2021, 6883-6891. https://doi.org/10.1021/acscatal.1c01325.

(112) Goods, S. H.; Guthrie, S. E. Mechanical Properties of Palladium and Palladium Hydride. Scr. Metall. Mater. 1992. https://doi.org/10.1016/0956-716X(92)90284-L.

(113) Al-Mufachi, N. A.; Rees, N. V.; Steinberger-Wilkens, R. Hydrogen Selective Membranes: A Review of Palladium-Based Dense Metal Membranes. Renewable and Sustainable Energy Reviews. 2015. https://doi.org/10.1016/j.rser.2015.03.026.

(114) Jewell, L. L.; Davis, B. H. Review of Absorption and Adsorption in the Hydrogen-Palladium System. Applied Catalysis A: General. 2006. https://doi.org/10.1016/j.apcata.2006.05.012.

(115) Gabrielli, C.; Grand, P. P.; Lasia, A.; Perrot, H. Investigation of Hydrogen Adsorption and Absorption in Palladium Thin Films. J. Electrochem. Soc. 2004. https://doi.org/10.1149/1.1797037.

(116) Wang, J.; Yu, L.; Hu, L.; Chen, G.; Xin, H.; Feng, X. Ambient Ammonia Synthesis via Palladium-Catalyzed Electrohydrogenation of Dinitrogen at Low Overpotential. Nat. Commun. 2018, 9 (1), 1795. https://doi.org/10.1038/s41467-018-04213-9.

What is claimed is:

1. A supported catalyst comprising:
   a plurality of support particles; and
   a plurality of catalyst particles disposed over each support particle, the catalyst particles having formula $PdH_x/C$ wherein x is 0.3 to 0.7 and C is a carbon support, wherein the supported catalyst has a BET surface area from about 90 $m^2/g$ to 110 $m^2/g$ and wherein the plurality of catalyst particle includes kink sites, step sites, and terrace sites.

2. The supported catalyst of claim 1, wherein the catalyst particles have formula $PdH_{0.5}/C$.

3. The supported catalyst of claim 1, wherein the support particles are carbon particles.

4. The supported catalyst of claim 1, wherein the catalyst particles have an average particle diameter of about 1 to 10 nm.

5. The supported catalyst of claim 1, wherein the catalyst particles have an average particle diameter of about 2.5 to 4 nm.

6. The supported catalyst of claim 1, wherein the supported catalyst has a faradaic efficiently greater than 90% for formate at −0.4 V (vs RHE) after 4 hours of initial operation.

7. The supported catalyst of claim 1, wherein the supported catalyst has a BET surface area greater than 100 $m^2/g$.

* * * * *